United States Patent
Kim et al.

(10) Patent No.: US 10,382,606 B2
(45) Date of Patent: Aug. 13, 2019

(54) MOBILE TERMINAL AND METHOD FOR CONTROLLING THE SAME

(71) Applicant: LG ELECTRONICS INC., Seoul (KR)

(72) Inventors: Nayeoung Kim, Seoul (KR); Yunmi Kwon, Seoul (KR); Minkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/231,878

(22) Filed: Dec. 24, 2018

(65) Prior Publication Data

US 2019/0149649 A1 May 16, 2019

Related U.S. Application Data

(63) Continuation of application No. 15/806,164, filed on Nov. 7, 2017, now Pat. No. 10,200,521.

(30) Foreign Application Priority Data

Jun. 9, 2017 (KR) .......................... 10-2017-0072709

(51) Int. Cl.
  *H04M 1/02* (2006.01)
  *H04M 1/03* (2006.01)
  *H04M 1/725* (2006.01)

(52) U.S. Cl.
  CPC ..... *H04M 1/72522* (2013.01); *H04M 1/0216* (2013.01); *H04M 1/03* (2013.01);
  (Continued)

(58) Field of Classification Search
  CPC ......... H04M 1/72586; H04M 1/72519; H04M 1/72522; H04M 1/7258; H04M 1/72583; H04M 1/72597
  See application file for complete search history.

(56) References Cited

U.S. PATENT DOCUMENTS 8,195,254 B2 * 6/2012 Oksman ................ G06F 1/1624
  455/575.3
9,430,057 B2 8/2016 Kwak et al.
(Continued)

OTHER PUBLICATIONS

United States Patent and Trademark Office U.S. Appl. No. 15/806,164, Notice of Allowance dated Sep. 24, 2018, 7 pages.

*Primary Examiner* — Wen W Huang
(74) *Attorney, Agent, or Firm* — Lee Hong Degerman Kang & Waimey

(57) ABSTRACT

A mobile terminal and a control method thereof are disclosed. A mobile terminal according to an embodiment of the present disclosure may include a terminal body provided with a first body and a second body, and formed to switch from either one of an open configuration in which inner surfaces of the first and second bodies are open and a closed configuration in which the inner surfaces are covered to the other one thereof; a hinge portion configured to connect the first and second bodies, and support the first and second bodies to rotate relative to each other; a display unit comprising inner display regions disposed on the inner surfaces of the first and second bodies, and first and second extended display regions extended from the inner display regions and disposed on outer sides of the first and second bodies; and a controller configured to display a notification icon indicating the occurrence of an event in the first extended display region when the event occurs in at least one application in the closed configuration, and move the notification icon to the second extended display region and change a notification priority of the event when a touch input applied to the notification icon is dragged to the second extended display region.

15 Claims, 22 Drawing Sheets

(52) U.S. Cl.
CPC ............ *H04M 2001/0204* (2013.01); *H04M 2201/38* (2013.01); *H04M 2201/42* (2013.01)

(56) References Cited

U.S. PATENT DOCUMENTS

| | | |
|---|---|---|
| 2003/0169212 A1 | 9/2003 | Nishihara |
| 2004/0204126 A1 | 10/2004 | Reyes et al. |
| 2008/0146285 A1 | 6/2008 | Lee et al. |
| 2011/0151935 A1 | 6/2011 | Oksman et al. |
| 2012/0013562 A1 | 1/2012 | Jyonoshita et al. |
| 2013/0076649 A1 | 3/2013 | Myers et al. |
| 2013/0145311 A1 | 6/2013 | Joo |
| 2013/0321340 A1 | 12/2013 | Seo et al. |
| 2015/0015512 A1 | 1/2015 | Kwak et al. |
| 2015/0095826 A1 | 4/2015 | Afin et al. |
| 2015/0109207 A1 | 4/2015 | Li et al. |
| 2015/0285678 A1 | 10/2015 | Guehne |
| 2016/0274790 A1 | 9/2016 | Li |
| 2016/0313963 A1 | 10/2016 | Kang et al. |
| 2016/0313966 A1 | 10/2016 | Jeong et al. |
| 2017/0083109 A1 | 3/2017 | Li et al. |
| 2018/0359350 A1 | 12/2018 | Kim et al. |

* cited by examiner

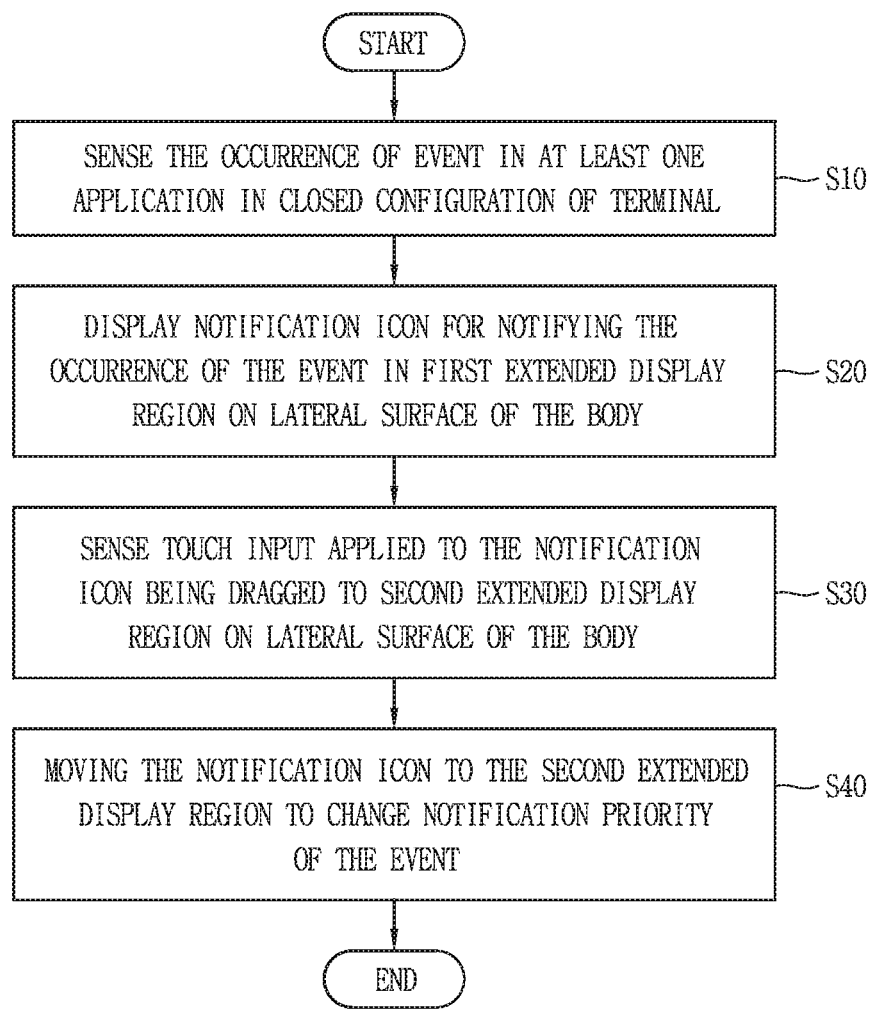

FIG. 7A
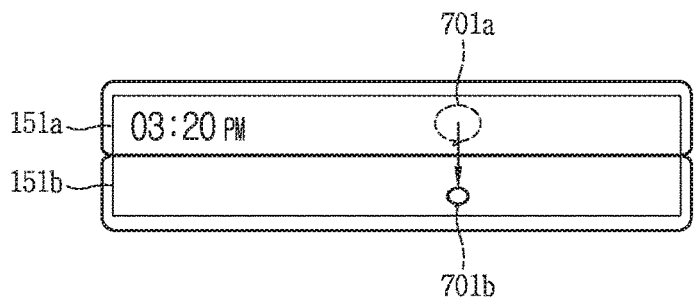
FIG. 7B
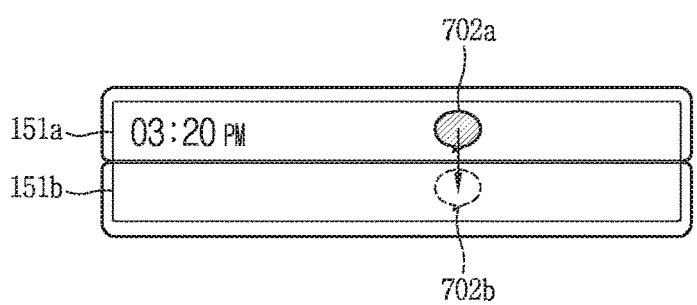
FIG. 7C
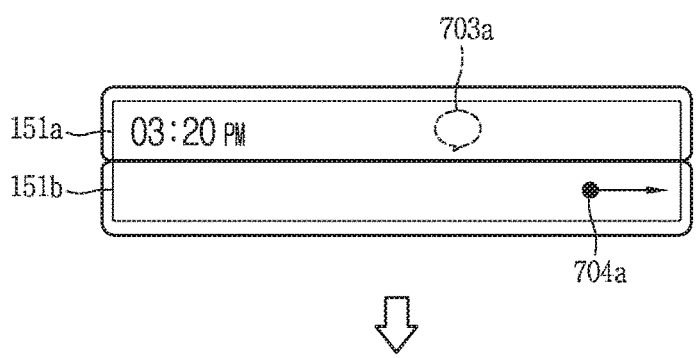
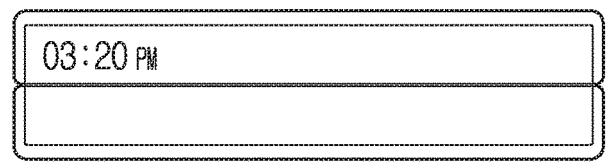

FIG. 12B
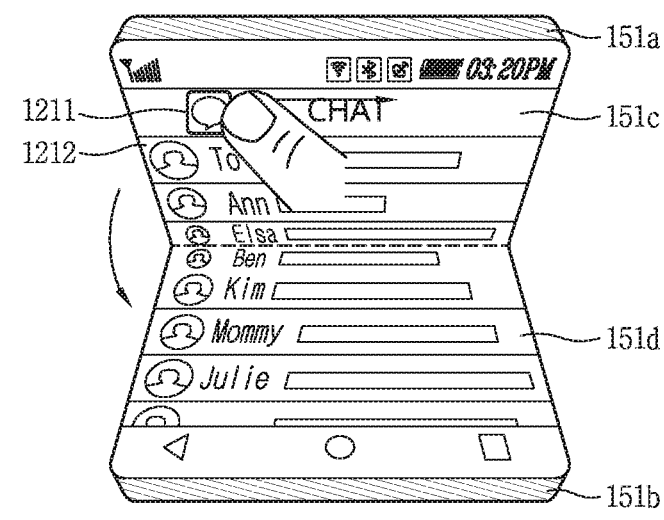
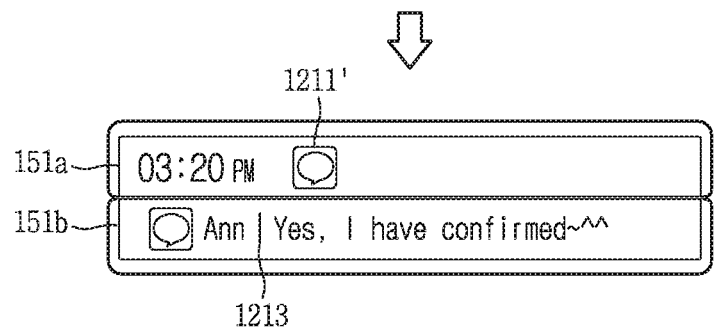

MOBILE TERMINAL AND METHOD FOR CONTROLLING THE SAME

CROSS-REFERENCE TO RELATED APPLICATIONS

This application is a continuation of U.S. patent application Ser. No. 15/806,164, filed on Nov. 7, 2017, now U.S. Pat. No. 10,200,521, which claims the benefit of earlier filing date and right of priority to Korean Patent Application No. 10-2017-0072709, filed on Jun. 9, 2017, the contents of which are all hereby incorporated by reference in their entirety.

BACKGROUND OF THE DISCLOSURE

1. Field of the Disclosure

The present disclosure relates to a mobile terminal having a structure in which a touch screen is extended to an outer side thereof, and a control method thereof.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

The functions of mobile terminals are diversified. For example, the functions may include data and voice communication, photographing and video shooting through a camera, voice recording, music file playback through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

Furthermore, a mobile terminal may be configured to be variously deformed into a folding or unfolding state. In such a case, when too many notifications or too much information related to an event are displayed on an outer side of the terminal in a folding state, a display may become complicated. In addition, there is a case where a user desires to quickly enter a previous operation again or continue the previous operation even subsequent to folding the terminal. In this case, there is inconvenience that the terminal must be reopened to perform the previous operation.

SUMMARY OF THE DISCLOSURE

Accordingly, an object of the present disclosure is to provide a mobile terminal capable of performing processing related to an event even when a foldable terminal is closed, and a control method thereof.

Furthermore, another object of the present disclosure is to provide a mobile terminal capable of varying a notification priority of an event even when a foldable terminal is closed, and then providing a user-customized screen configuration when the terminal is opened, and a control method thereof.

In addition, yet still another object of the present disclosure is to provide a mobile terminal capable of easily checking and controlling an inner screen configuration when a foldable terminal is opened to perform an operation and then closed, and a control method thereof.

A mobile terminal according to an embodiment of the present disclosure as described above may include a terminal body provided with a first body and a second body, and formed to switch from either one of an open configuration in which inner surfaces of the first and second bodies are open and a closed configuration in which the inner surfaces are covered to the other one thereof; a hinge portion configured to connect the first and second bodies, and support the first and second bodies to rotate relative to each other; a display unit comprising inner display regions disposed on the inner surfaces of the first and second bodies, and first and second extended display regions extended from the inner display regions and disposed on outer sides of the first and second bodies; and a controller configured to display a notification icon indicating the occurrence of an event in the first extended display region when the event occurs in at least one application in the closed configuration, and move the notification icon to the second extended display region and change a notification priority of the event when a touch input applied to the notification icon is dragged to the second extended display region.

According to an embodiment, information related to the event may be displayed in the second extended display region while the touch input applied to the notification icon is maintained in the first extended display region, and information related to the event may disappear in response to the touch input being dragged to the second extended display region.

According to an embodiment, when either one of the first and second bodies is covered by the counterpart in the closed configuration, notification priorities of each of the first and second extended display regions may be determined in the order of being stacked from the counterpart.

According to an embodiment, a notification priority corresponding to one extended display region displayed with time information between the first and second extended display regions in the closed configuration may be set to be higher than a notification priority corresponding to the other one thereof.

According to an embodiment, when the closed configuration is switched to the open configuration subsequent to changing the notification priority, an event related screen to which the changed notification priority is applied may be provided to the inner display region.

According to an embodiment, as the closed configuration is switched to the open configuration in a state where a plurality of notification icons having different notification priorities are displayed in the first and second extended display regions, respectively, an image change in which a plurality of notification icons having different notification priorities are gradually drawn from respective extended display regions into different inner display regions may be generated on the display unit.

According to an embodiment, a rate of image change gradually drawn into the different inner display regions may correspond to a speed at which the closed configuration is switched to the open configuration.

According to an embodiment, when a notification priority of the event is changed, an image of the relevant notification icon may be varied into an image corresponding to the changed notification priority.

According to an embodiment, the controller may process an event differently according to a notification priority corresponding to the notification icon when a touch input is applied to the relevant notification icon.

According to an embodiment, when information related to the event is displayed and a touch input is applied to the information and the main body is switched to the open configuration, screen information including information related to the event or screen information related to the processing of information related to the event may be provided in the inner surface display region.

According to an embodiment, when a first execution screen and a second execution screen are displayed in the inner display regions with respect to the hinge portion, and the main body is switched to a closed configuration, a plurality of icons corresponding to the first and second execution screens may be displayed in the first and second extended display regions mapped to the inner display regions, respectively, and the controller may control either one of the first and second execution screens displayed at positions of the corresponding inner display regions when a touch input is applied to one of the plurality of icons.

According to an embodiment, when the main body is closed while a search operation is carried out using the inner display regions, the controller may provide index information indicating an interrupted position of the search operation to one of the first and second extended display regions, and a plurality of indexes related to the search operation may be displayed in the first and second extended display regions when a touch input is applied to the index information, and a display order of the plurality of indexes may correspond to the arrangement positions of the first and second extended display regions.

According to an embodiment, when a touch input is applied to any one of the plurality of indexes and the main body is opened, a search result screen of a position corresponding to the relevant index may be provided to the inner display regions.

According to an embodiment, the search unit of the plurality of indexes may be varied based on a touch gesture applied to the first and second extended display regions while the plurality of indexes are displayed.

According to an embodiment, when a touch is applied to an icon of an application displayed in the inner display region in the open configuration, and the main body is switched to a closed configuration, the controller may change a notification priority of an event occurring in the relevant application, and the icon of the relevant application in the closed configuration may be displayed in an extended display region different from an icon of a different application.

According to an embodiment, when a specific region is bookmarked on a screen displayed in the inner display region in the open configuration and the main body is closed, the controller may display the notification icon in either one of the first and second extended display regions and an indicator for making a shortcut to the bookmarked specific region in the other one thereof.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 5 is a flowchart for explaining a representative operation implemented in a mobile terminal associated with the present disclosure;

FIGS. 7A, 7B and 7C are exemplary views associated with a method of displaying a notification icon having a changed notification priority in a mobile terminal associated with the present disclosure; and FIGS. 8A, 8B, 9A, 9B, 10, 11A, 11B, 12A, 12B, 13A, 13B, 13C and 14 are various exemplary views associated with a method of controlling an extended display region on an outer side of a mobile terminal associated with the present disclosure to quickly control a screen displayed in an inner display region thereof.

DETAILED DESCRIPTION OF THE PREFERRED EMBODIMENTS

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

Figure 1:
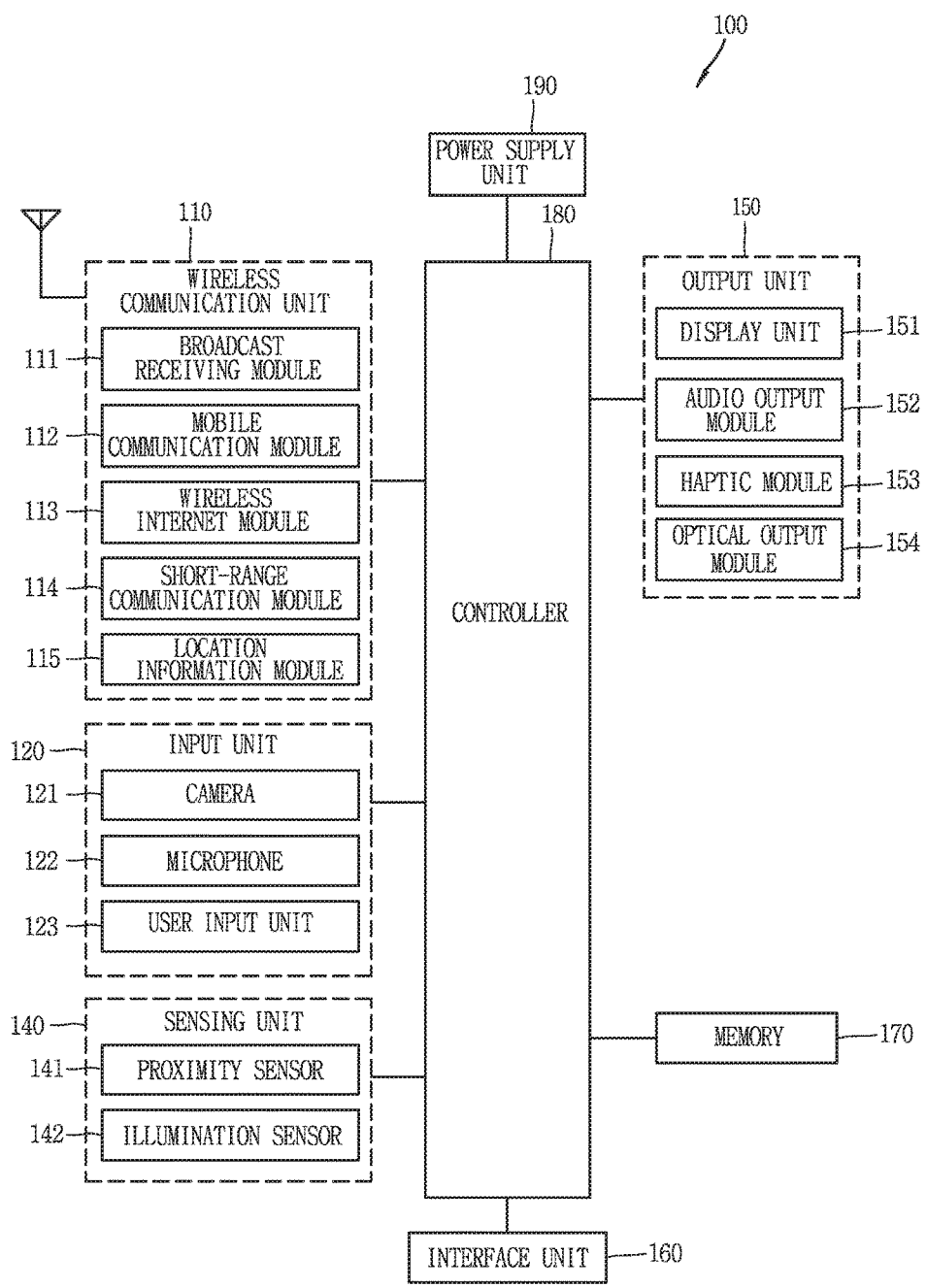
FIG. 1 is a block diagram for explaining a mobile terminal associated with the present disclosure.

However, it may be easily understood by those skilled in the art that the configuration according to the exemplary embodiments of this specification can also be applied to stationary terminals such as digital TV, desktop computers and the like, excluding a case of being applicable only to the mobile terminals. FIG. 1 is a block diagram for explaining a mobile terminal associated with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.) Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Furthermore, the display unit 151 according to the present disclosure may be configured to be deformable by an external force. The deformation may be at least one of curving, bending, folding, twisting and rolling of the display unit 151. The deformable display unit 151 may be referred to as a 'flexible display unit.' Here, the flexible display unit 151 may include both a general flexible display, an e-paper and a combination thereof.

The general flexible display denotes a light, non-fragile display, which still exhibits characteristics of the conventional flat panel display and is fabricated on a flexible substrate which can be curved, bent, folded, twisted or rolled.

Furthermore, the e-paper is a display technology employing the characteristic of a general ink, and is different from the conventional flat panel display in view of using reflected light. The e-paper may change information by using a twist ball or an electrophoresis using a capsule.

When in a configuration in which the flexible display unit 151 is not deformed (for example, in a configuration with an infinite radius of curvature and, hereinafter, referred to as a first configuration), a display region of the flexible display unit 151 becomes a flat surface. In a configuration in which the display unit is deformed from the first configuration by an external force (for example, a configuration with a finite radius of curvature, hereinafter, referred to as a second configuration), the display region may become a curved surface. As illustrated in the drawing, information displayed in the second configuration may be visual information output on the curved surface. The visual information may be realized in such a manner that a light emission of each unit pixel (sub-pixel) arranged in a matrix configuration is controlled independently. The unit pixel denotes an elementary unit for representing one color.

The flexible display unit 151 may be placed in a curved state (for example, a state of being curved from up to down or from right to left), other than a flat state, in the first configuration. In this case, when an external force is applied to the flexible display unit 151, the flexible display unit 151 may be deformed back into a flat state (or less curved state) or into a more curved state.

On the other hand, the flexible display unit 151 may implement a flexible touch screen using a touch sensor in combination with a touch sensor. When a touch is input onto the flexible touch screen, the controller 180 (refer to FIG. 1) may execute a control corresponding to the touch input. The flexible touch screen may be configured to sense a touch input even in the second configuration as well as in the first configuration.

On the other hand, the mobile terminal 100 according to the modified example may include a deformation sensor which senses the deformation of the flexible display unit 151. The deformation sensor may be included in the sensing unit 140 (refer to FIG. 1A).

The deformation sensor may be provided in the flexible display unit 151 or the case 101 to sense information related to the deformation of the flexible display unit 151. Here, the information related to the deformation of the flexible display unit 151 may be a deformed direction, a deformed degree, a deformed position, a deformed time, an acceleration that the deformed flexible display unit 151 is restored, and the like. In addition to those, such information may be various information which is sensible in response to curving of the flexible display unit 151.

Furthermore, the controller 180 may change information displayed on the flexible display unit 151 or generate a control signal for controlling a function of the mobile terminal 100, based on the information related to the deformation of the flexible display unit 151 sensed by the deformation sensor.

On the other hand, the mobile terminal 100 according to the modified example may include a case for accommodating the flexible display unit 151. The case may be configured to be deformable along with the flexible display unit 151 by an external force in consideration of the characteristics of the flexible display unit 151.

Moreover, a battery (not shown) provided in the mobile terminal 100 may be also configured to be deformed along with the flexible display unit 151 by an external force in consideration of the characteristics of the flexible display unit 151. A stack and folding method for stacking up battery cells may be applicable to implement the battery.

The configuration deformation of the display unit 151 may not be necessarily limited to an external force. For example, when the flexible display unit 151 is in a first configuration, it may be deformed to a second configuration by a command of a user or application.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments are implemented by the controller 180.

On the other hand, for software implementation according to the present disclosure, the embodiments such as procedures or functions may be implemented together with separate software modules. The software codes can be implemented with a software application written in any suitable programming language. The software codes may be stored in the memory 160 and executed by the controller 180.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

Figure 2A:
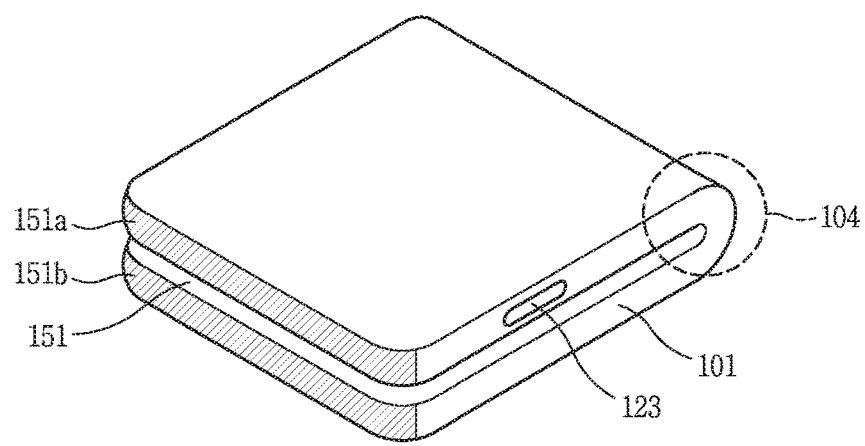
FIGS. 2A, 2B and 2C are conceptual views illustrating an example in which a mobile terminal associated with the present disclosure is folded or opened is seen from different directions.
Figure 2B:
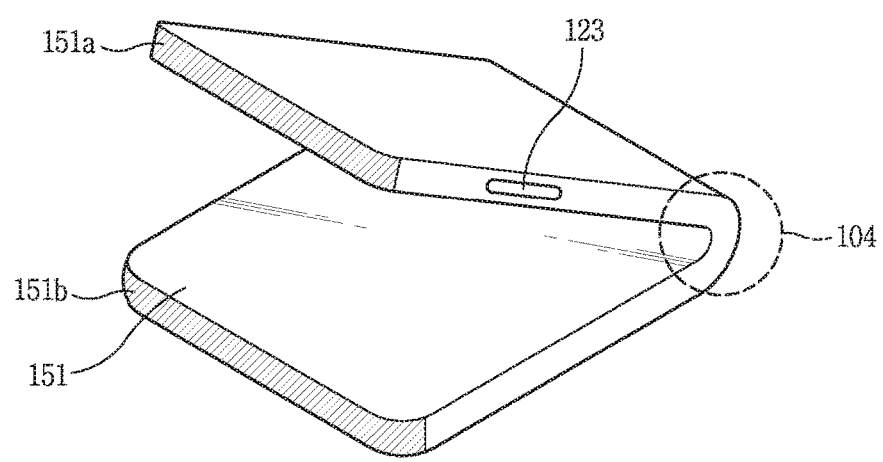
Figure 2C:
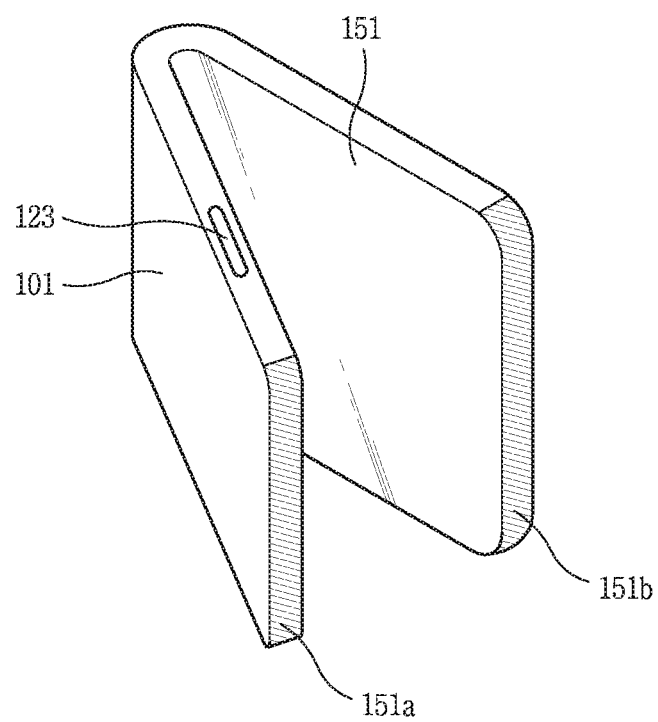

Hereinafter, FIGS. 2A, 2B and 2C are conceptual views illustrating an example in which a mobile terminal associated with the present disclosure is folded or opened is seen from different directions.

First, referring to FIG. 2A, the main body of the mobile terminal according to the present disclosure includes a first and a second body 101, and a hinge portion 104 for connecting the first and second bodies 101, and supporting the first and second bodies to rotate relative to each other.

For the mobile terminal, the first and second bodies 101 may rotate relative to each other around the hinge portion 104, thereby implementing an open configuration in which at least part of the inner surface is exposed or a closed configuration in which the entire inner surface is covered. FIG. 2A illustrates a configuration in which the mobile terminal 100 is closed.

In the closed configuration, a first extended display region 151a disposed on the first body extended from the inner display region 151 and a second extended display region 151b disposed on the second body are disposed adjacent to each other. Furthermore, the display unit 151 may be accommodated into the first and second bodies 101.

Hereinafter, a display region disposed on an inner surface of the first and second bodies 101 is referred to as an inner display region to distinguish it from the first and second extended display regions 151*a*, 151*b*. In addition, the same reference numerals as those of the display unit 151 described above are referred to in the inner display region. Furthermore, hereinafter, the display unit is used to refer to both the inner display region 151 and the first and second extended display regions 151*a*, 151*b*.

Referring again to FIG. 2A, a user input unit 123 may be provided on an outer surface of the first body. Furthermore, though not illustrated in the drawing, another user input may be provided on another outer surface of the second body and/or on a rear surface of the first and second bodies.

A folder type terminal body (first and second bodies 101) according to an embodiment of the present disclosure may be formed so that at least one side thereof is folded or unfolded. As illustrated in FIG. 2A, a "closed configuration" indicates a configuration in which the first body and the second body are arranged to overlap with each other, that is, a configuration in which the first and second bodies are folded around the hinge portion 104. In a closed configuration, the first and second bodies are disposed to face each other, and the first and second extended display regions 151*a*, 151*b* described above are disposed adjacent to each other.

The first and second extended display regions 151*a*, 151*b* are extended from the inner display region 151 disposed on the inner surfaces of the first and second bodies, respectively.

FIGS. 2B and 2C show a configuration in which the mobile terminal 100 associated with the present disclosure is partially open. The mobile terminal 100 may be opened by relatively rotating at least one of the first and second bodies around the hinge 104 in the closed configuration of FIG. 2A. In other words, when the first and second bodies rotate relative to each other around the hinge portion 104, the inner display region 151 may be folded or unfolded.

The hinge portion 104 may be provided with sensors capable of sensing a speed or pressure of the relative rotation as well as a supporting mean for supporting the relative rotation of the first and second bodies. Furthermore, the hinge portion 104 supports the mobile terminal 100 to be folded at a specific angle within a range of 0 to 180 degrees according to the structure of the mobile terminal 100, or a specific angle within a range of 0 to 360 degrees according to the hinge portion structure.

Furthermore, the mobile terminal 100 may further include a case (a casing, a housing, a cover, and the like) that forms an external appearance of the first and second bodies 101. In this embodiment, the case may be divided into a front case and a rear case. Here, various electronic components are embedded in a space formed between the front case and the rear case. At least one middle case may be additionally disposed between the front case and the rear case. Furthermore, the cases may be formed by injection-molding a synthetic resin or may be also formed of a metal material such as stainless steel (STS), titanium (Ti), or the like. In addition, the display unit 151, 151*a*, 151*b* may form a touch screen along with a touch sensor, and in this case, the touch screen may function as the user input unit 123.

In the present disclosure, the 'open configuration' denotes a configuration in which an inner surface of the terminal is exposed, namely, a configuration in which an inner surface display area 151 of the terminal is partially or completely unfolded with respect to the hinge portion 104, and exposed on a front surface thereof. It is similar to opening a book. As described above, the 'open configuration' may include not only a case where the inner display region 151 is unfolded on a flat surface, but also a 'bent configuration' in which the hinge portion 104 is bent backward by a predetermined angle.

Furthermore, in the present disclosure, a 'folding event' denotes that the first and second bodies are relatively rotated with respect to the hinge portion 104 in a configuration in which the mobile terminal 101 is completely unfolded or partially opened.

Figure 3A:
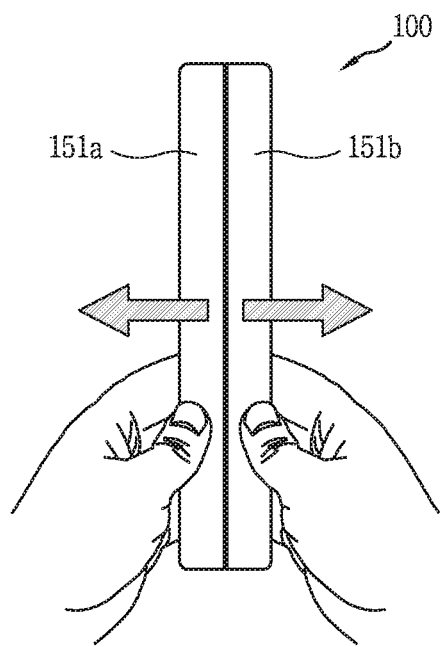
FIGS. 3A, 3B, 3C and 3D are conceptual views illustrating an example of opening a folded mobile terminal in different directions in a mobile terminal according to the present disclosure.
Figure 3B:
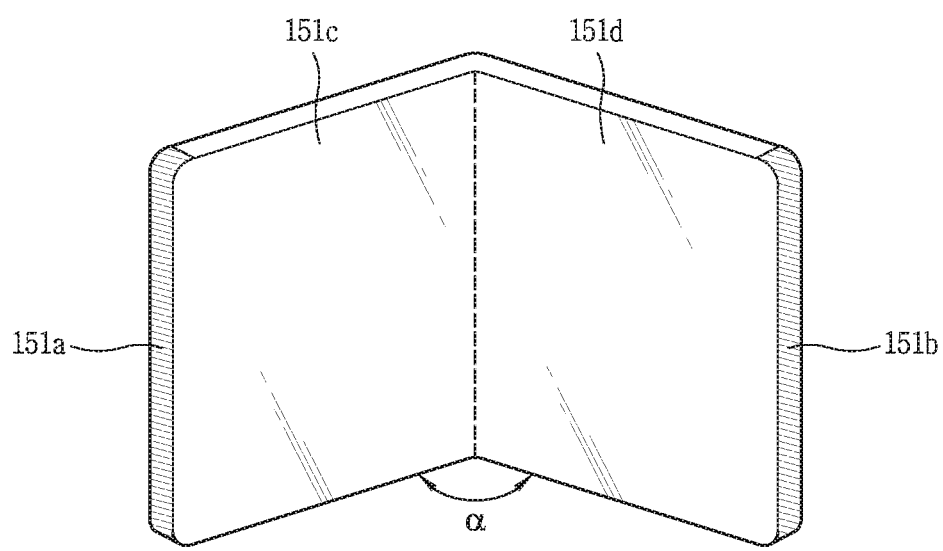
Figure 3C:
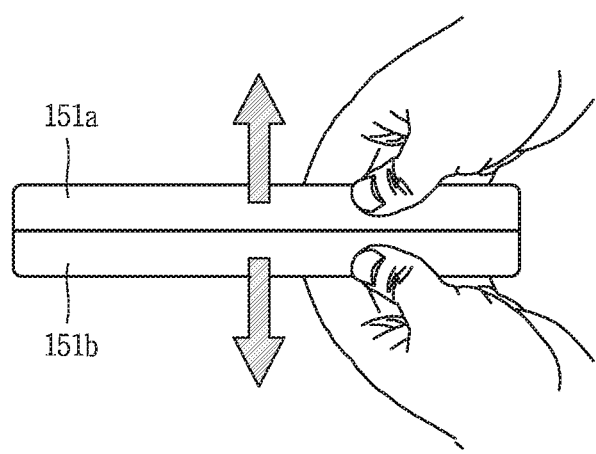
Figure 3D:
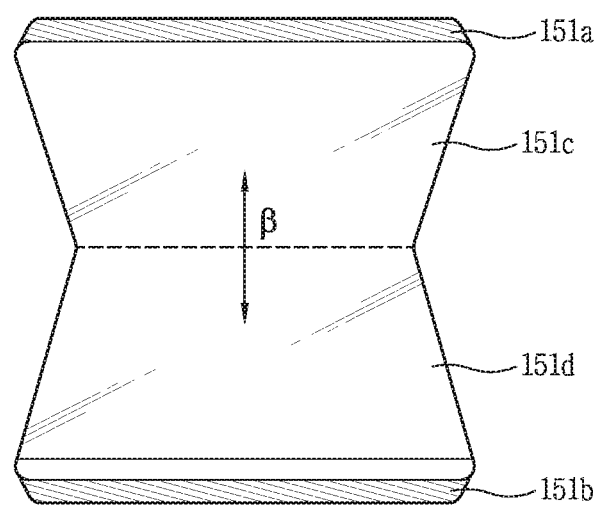

FIGS. 3A, 3B, 3C and 3D are conceptual views illustrating an example of opening a folded or closed mobile terminal in different directions in a mobile terminal according to the present disclosure. FIGS. 3A and 3B are exemplary views in which the mobile terminal in a closed configuration is opened in a horizontal direction, and FIGS. 3C and 3D are exemplary views in which the mobile terminal in a closed configuration is opened in a vertical direction.

Referring to FIGS. 3A and 3B, as pulling forces in the left and right directions are applied to the first and second bodies, the first and second extended display regions 151*a*, 151*b*, which have been adjacent to each other, move away from each other to open mobile terminal 100. The exposed inner display region 151 is folded in both the left and right regions 151*c*, 151*d* around the hinge portion, and when the mobile terminal 100 is completely opened, the inner display region 151 is flattened.

Referring to FIGS. 3C and 3D, as pulling forces in the upward and downward directions are applied to the first and second bodies, the first and second extended display regions 151*a*, 151*b*, which have been adjacent to each other, move away from each other to open mobile terminal 100. The exposed inner display region 151 is folded in both the top and bottom regions 151*c*, 151*d* around the hinge portion, and when the mobile terminal 100 is completely opened, the inner display region 151 is flattened.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof. When an event occurs in a configuration where a foldable mobile terminal is closed, the mobile terminal according to the embodiment of the present disclosure may easily and quickly perform an operation related to the processing of the event without opening the terminal. Furthermore, an operation that has been executed in a configuration where the terminal is open may be carried out seamlessly subsequent to closing the terminal. In addition, it may be possible to construct a screen to be displayed in an inner display region using an extended display region provided on an outer side in a closed configuration of the terminal.

Hereinafter, with reference to FIG. 4, a representative operation implemented in a mobile terminal associated with the present disclosure will be described in detail.

First, in a closed configuration of the mobile terminal 100 according to the present disclosure, the first and second extended display regions 151*a*, 151*b* are exposed on the front side in an adjacent structure. At this time, notification icons 401, 402, 403 indicating that an event has occurred in at least one application together with time information 404 are displayed in one of the first and second extended display regions 151a, 151b.

Here, the application is a concept including a widget, a home launcher, and the like, and refers to all types of programs that can be run on the terminal. Accordingly, the application may be any program that performs functions of a web browser, video playback, message transmission/reception, schedule management, and application update.

In addition, the occurrence of an event may include for example, when there is a missed call, when there is an application to be updated, when a message arrives, charging, power on, power off, an LCD awake key, an alarm, an incoming call, a missed notification of the terminal, and the like.

Figure 4:
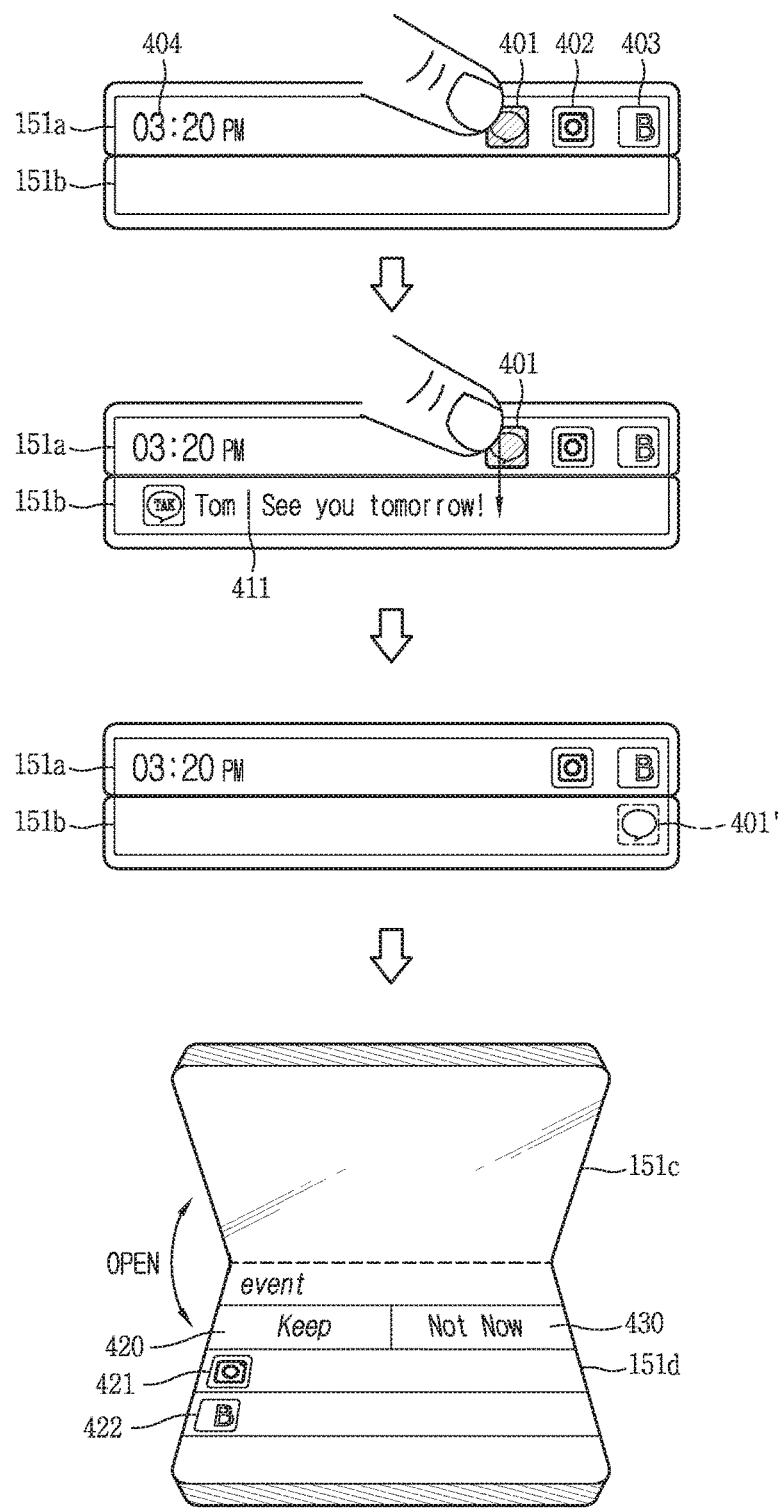
FIG. 4 is a conceptual view for explaining a representative operation implemented in a mobile terminal associated with the present disclosure.

For an example, a first notification icon 401 in FIG. 4 may indicate the arrival of a message in an SNS application. For another example, when specific information is received through the wireless communication unit of the terminal, it may be seen that an event has occurred in an application related to the specific information. Alternatively, in case where there is an item entered by the user in schedule management, when it becomes a date corresponding to the item, it is regarded that an event has occurred in a schedule management application.

The notification icons 401, 402, 403 are displayed to correspond to the order of occurrences of events along a lateral surface of the first extended display region. For example, the first notification icon 401 may be a notification icon corresponding to an event that has occurred before the second and third notification icons 402, 403. In this state, when a new event occurs, a fourth notification icon corresponding to the new event may be generated at an end of the right while the notification icons 401, 402, 403 that have been displayed in the first extended display region 151a are pushed to the left by a predetermined distance.

On the other hand, a maximum number of notification icons that can be displayed in the first extended display region 151a may be determined in advance. In this case, when events exceeding the predetermined maximum number are accumulated, a notification icon corresponding to an event that has occurred the longest ago may disappear from the display region or may be moved and displayed in the second extended display region 151b.

Furthermore, though not illustrated in the drawing, in addition to the notification icons 401, 402, 403 for notifying the occurrences of events in the first extended display region 151a, other types of icons, for example, an icon of a recently executed application, an icon of a frequently used application, an icon including specified update information such as recent news or weather, and the like may be displayed together. In this case, the extended display regions 151a, 151b may be divided into a plurality of virtual regions in which different types of information are displayed.

When a touch input is applied to the first notification icon 401 displayed in the first extended display region 151a, information related to an event corresponding to the first notification icon 401, for example, the content 411 of a received message, may be provided in the second extended display region 151b. At this time, when the touch input applied to the first notification icon 401 is released, information related to the event displayed in the second extended display region 151b may disappear immediately.

Subsequently, when the touch input applied to the first notification icon 401 is dragged toward the second extended display region 151b, the controller 180 may move the first notification icon 401 to the second extended display region 151b along a drag path to change the notification priority of the relevant event. At this time, the information 411 related to the event that has been displayed in the second extended display region 151b may disappear as the first notification icon is moved to the second extended display region 151b (401').

On the other hand, the notification priority of an event denotes that at least one of a display method of notifying the occurrence of an event, an exposure range of information related to an event, and a processing method of an event is classified in a different manner. For example, when the notification priority of an event is high, more information related to the event may be exposed. On the contrary, when the notification priority of an event is low, the exposure of information related to the event may be minimized or the display of the notification icon may be dimmed. Alternatively, it may be said that a case where the notification priority of an event is low is excluded from the notification priorities of events. In such a case, it may be understood that the notification is excluded when an additional event occurs.

Accordingly, changing the notification priority of an event denotes changing at least one of a display method of notifying the occurrence of an event, an exposure range of information related to the event, and a processing method of the event from a previous one.

In one example, when a notification icon moves from the first extended display region 151a to the second extended display region 151b along a drag path, the controller 180 may control graphic a user interface (GUI) to display a first portion of the notification icon in the first extended display region 151a and display the remaining second portion in the second extended display region 151b on a boundary surface between the first and the second extended display regions. As a result, the notification icon may appear to move more seamlessly.

Furthermore, in some cases, the display arrangement of the remaining notification icons may be reconfigured according to the movement of the notification icon. For example, if the second notification icon 402 disposed in the middle in FIG. 4 is moved, then the first notification icon 401 moves to the right and fixed to a position where the second notification icon 402 has been displayed.

On the other hand, the moved notification icon 401' is fixed at a position corresponding to the display order of the second extended display region 151b regardless of the point from which the drag input is released. For example, as illustrated in FIG. 4, when the moved first notification icon 401' is displayed in a state where no information is displayed in the second extended display region 151b, it may be fixed at an end of the right regardless of the point from which the drag input is released. For another example, when the moved first notification icon is displayed in a state where other information or icons are displayed in the second extended display region 151b, the arrangement of the continuously displayed information or icons may be reconstructed, and then the moved first notification icon 401' may be positioned at a proper position.

In addition, the controller 180 may perform the processing of an event corresponding to a notification icon differently according to different types of touch gestures applied to the first and second extended display regions 151a, 151b. For example, it may be possible to check the relevant event using a long touch input to the notification icon and a subsequent short touch input, and then remove the notification icon.

In the present disclosure, it may be possible to change the notification priority of the relevant event based on a drag input to the notification icon.

Specifically, when a drag input is applied in a downward direction to the notification icon displayed in the first extended display region 151*a*, a level of notification priority of the event is decreased. Accordingly, the relevant event may be excluded from the notification. Alternatively, when a drag input is applied in an upward direction to the notification icon displayed in the second extended display region 151*b*, a level of notification priority of the event is increased. Accordingly, the setting of the relevant event may be changed to receive a push notification again.

In this regard, for an embodiment, when a touch is applied to a notification icon having a different notification priority, the controller 180 may perform the processing of the relevant event in a different manner. For example, when a touch input is applied to the notification icon of an event having the highest notification priority displayed in the first extended display region 151*a*, the controller 180 may provide information related to the event to the second extended display region 151*b*. Furthermore, when a touch input is applied to the notification icon of an event excluded from the priorities displayed in the second extended display region 151*b*, a graphic object indicating that can be deleted may be displayed on the relevant notification icon.

For another embodiment, the controller 180 may control a screen displayed on the inner display region using the varied notification priority. Specifically, it may be controlled in such a manner that content related to an event having a high notification priority is displayed in the inner display region, and a notification of an event having a low notification priority is restricted from being displayed in the inner display region.

Referring to FIG. 4 again, in a configuration in which the terminal body is closed, the notification icons 402, 403 having high priorities may be displayed in the first extended display region 151*a*, and the notification icon 401' excluded from the notification priorities may be displayed in the second extended display region 151*b*, and gradually switched to an open configuration as the first body and the second body relatively rotate with respect to the hinge portion 104 of the main body.

As the main body is opened as described above, the adjacent first and second extended display regions 151*a*, 151*b* move relative to each other to expose the inner display regions 151*c*, 151*d* as they are apart from each other. Screen information including notification information 421, 422 of events having high notification priorities that have been displayed in the first extended display region 151*a* is displayed in the exposed one inner display region 151*d*. In addition, the display of an event having a low notification priority or excluded from the notification priorities is provided separately using another tap 430. Accordingly, low-priority event related information provided to the another tap 430 is selectively provided only when the user selects the tap. In other words, low-priority event related information is hidden. As a result, the user may arrange in advance only events desired to be seen even in the closed configuration of the terminal, thereby providing user convenience and simplification of a display.

On the other hand, the notification priority of an event may be determined according to a configuration where the terminal is placed on the floor and an arrangement position of the extended display region.

Specifically, when a counterpart covers either one of the first and second bodies connected on the basis of the hinge portion in the closed configuration of the terminal, notification priorities of the first and second extended display regions, respectively, may be determined differently according to the order of being stacked from the counterpart. For example, when the first body is placed on the floor surface (counterpart), it is configured such that the first extended display region disposed on the first body has a lower notification priority and the second extended display region disposed on the second body has a high notification priority. On the contrary, in a configuration in which the second body is raised on the floor surface, a lower notification priority is set in the second extended display region disposed on the second body. In other words, the setting of a notification priority is changed adaptively according to a configuration in which the terminal is placed. The determination of such a configuration may be carried out by a combination of at least two of the proximity sensor, the illumination sensor, and the gyro sensor.

For another example, a notification priority corresponding to one extended display region displayed with time information between the first and second extended display regions in the closed configuration may be set to be higher than a notification priority corresponding to the other one thereof. It may be applied mainly when a part of the terminal is not covered by the counterpart or when the terminal is in a sleep mode for a long time, and when the user is gripping the terminal like a book.

As described above, according to the present invention, when an event occurs in a closed configuration of a foldable terminal, the user may quickly check information related to the event and easily change a notification priority using an outer extended display region in the closed configuration, thereby providing convenience capable of notifying an additional event or selectively viewing only information desired to be seen when the terminal is opened later.

FIG. 5 is a flowchart for explaining a representative operation implemented in a mobile terminal associated with the present disclosure.

Referring to FIG. 5, first, the process of sensing an event occurring in at least one application in a configuration in which the main body of the mobile terminal 100 according to the present disclosure is closed is carried out (S10).

Accordingly, a notification icon indicating the occurrence of the event is displayed in the first extended display region on a lateral surface of the main body (S20). Here, the notification icon may correspond to an icon of an application in which the event occurs.

Furthermore, the event may be a message reception, and the information may be the content of a message. For another example, the event may be a notification of a schedule set in schedule management, and the information may be the detailed information of the set schedule information, and the like. For still another example, the event may be an occurrence of an application to be updated, and the information may be the detailed information of the application to be updated, and the like.

Next, a touch input applied to the notification icon that is being dragged to the second extended display region adjacent to the first extended display region may be sensed (S30).

In this case, a different control may be carried out depending on the type of touch input applied to the notification icon. For example, when a short touch is applied to the notification icon, the notification content is updated, and when the long touch is applied, the notification icon may be deleted. With regard to the present example, when a drag input is applied to the notification icon, the controller changes the notification priority of the event differently while providing information related to the event to another extended display region.

Specifically, in response to the drag-touch input, the notification icon moves to the adjacent second extended display region along a drag path, and the notification priority of the event is changed to a different one (S40).

When the notification priority is changed as described above, the processing of the event corresponding to the notification icon is changed so as to correspond to the changed notification priority.

Specifically, for an example, when an additional event occurs, a notification icon indicating the occurrence of the additional event may be displayed in the second extended display region since then. For another example, a range of information related to displayable events in the extended display region may be limited or extended as the notification priority is changed. For still another example, as the notification priority is changed, a display method for the relevant event in the inner display region may be changed. For yet still another example, an operation such as whether or not to additionally notify an event, whether or not to store an event, a storage period, and whether or not provide a response screen may be processed differently.

On the other hand, the changed notification priority may not be fixed as it is but may be adaptively changeable. For example, when a notification icon displayed in the second extended display region is dragged to the first extended display region, the relevant notification icon may move to the first extended display region and the notification priority may be changed again.

As described above, according to the present disclosure, it may be possible to perform processing related to an event using the extended display region at an outer side without opening the terminal, and for such an example, it may be possible to easily change the notification priority of an event based on a drag touch input. Furthermore, the user may view the display state and position of the notification icon to quickly know that the notification priority of the event has been changed.

Figure 6A:
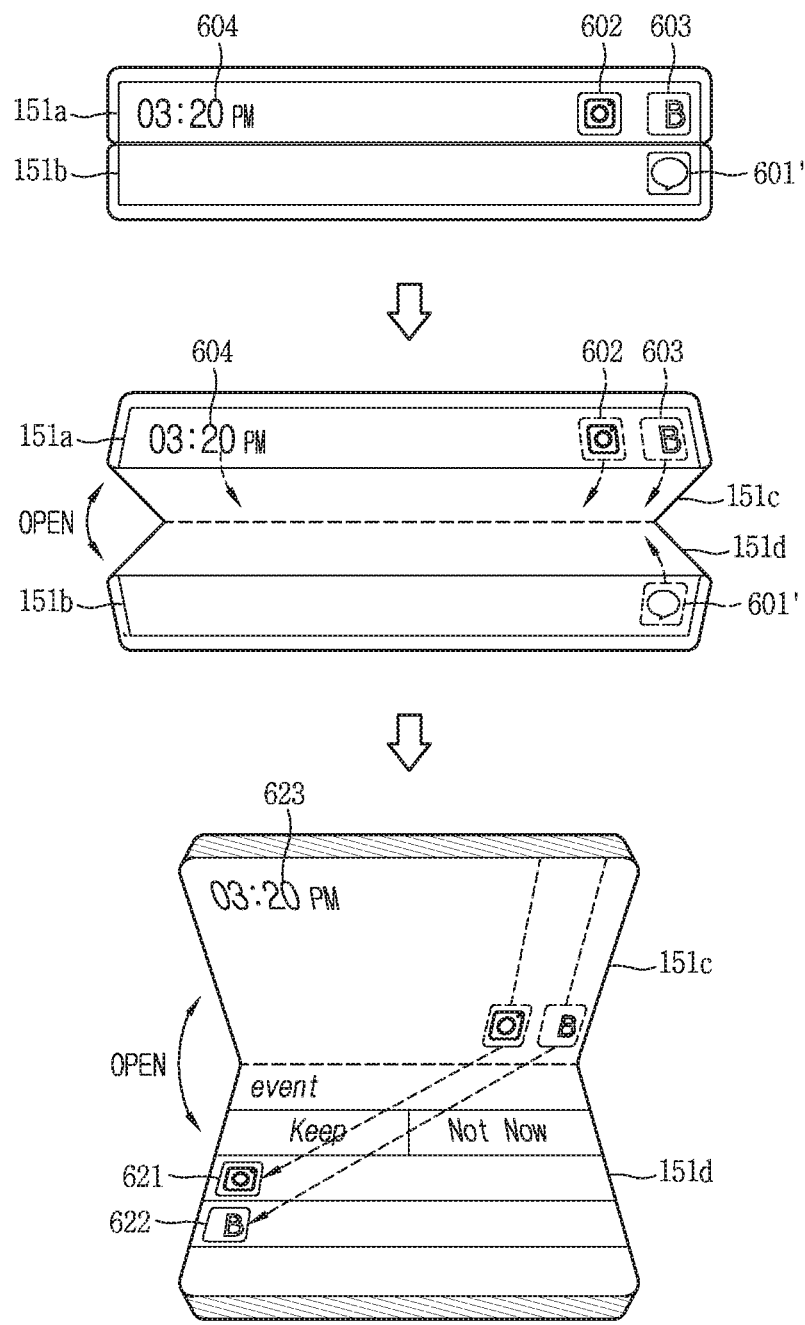
FIGS. 6A and 6B are conceptual views illustrating a visual change of a notification icon displayed in an extended display region as a main body is opened and closed in a mobile terminal associated with the present disclosure.
Figure 6B:
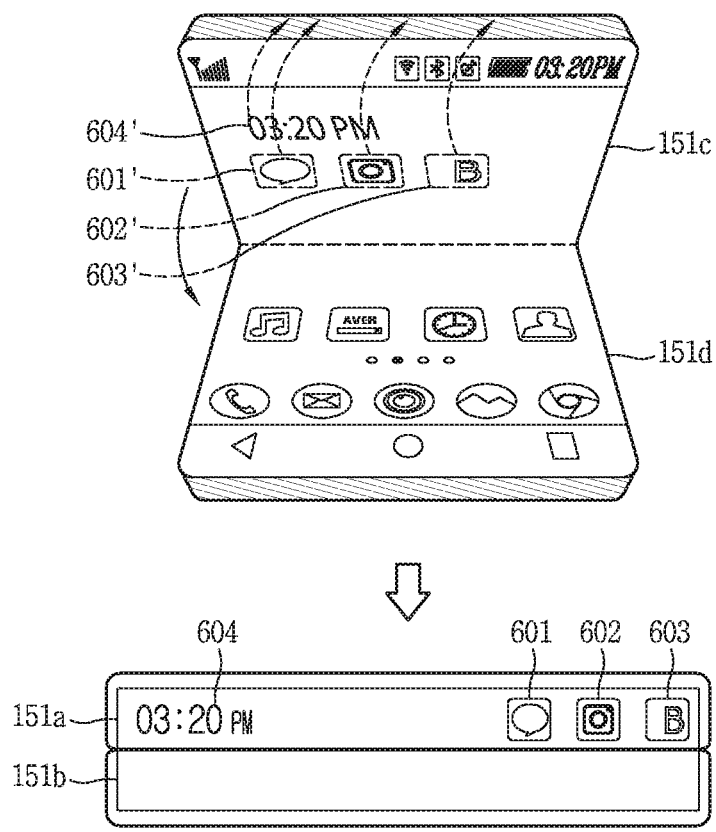

Hereinafter, FIGS. 6A and 6B are conceptual views illustrating a visual change of a notification icon displayed in an extended display region as the main body is opened and closed in a state where the notification icon of an event is displayed in a mobile terminal associated with the present disclosure.

For an example, when the main body is changed to an open configuration subsequent to changing the notification priority of an event using a drag touch input to the notification icon, an event-related screen to which the changed notification priority is applied is provided in the inner display region.

For another example, as the terminal is switched to an open configuration in a state where a plurality of notification icons having different notification priorities are displayed in the first and second extended display regions, respectively, an image change in which a plurality of notification icons having different notification priorities are gradually drawn from respective extended display regions into different inner display regions is generated on the display unit.

With regard to this, referring to FIG. 6A, in a closed configuration of the terminal, notification icons 602, 603 having high notification priorities together with time information 604 are displayed in the first extended display region 151*a*, and when the terminal is gradually opened while a notification icon 601' excluded from the priorities is displayed in the extended display region 151*b*, the time information and the second and third notification icons 602, 603, 604 move toward the first inner display region 151*c* extended from the first extended display region and the first notification icon 601' moves toward the second inner display region 151*d* extended from the second extended display region, respectively. It provides a visual effect as notification icons being drawn into the terminal.

For an example, a rate of image change gradually drawn into different inner display regions may correspond to a speed at which a closed configuration of the terminal is switched to an open configuration. In other words, when the terminal is opened quickly, a moving speed of the notification icon is accelerated, and when the terminal is opened slowly, a moving speed of the notification icon is slowed down. To this end, the controller 180 of the mobile terminal may recognize a speed of a configuration change through a combination of an acceleration sensor, a geomagnetic sensor, and the like, capable of detecting a rotational speed applied to the hinge portion.

Next, as illustrated in FIG. 6A, time information is fixed to a designated position, for example, an upper end of the first inner display region 151*c* (623). On the contrary, the second and third notification icons continue to move toward the second inner display region 151*d* to be located within an event related screen (621, 622). In addition, for the first notification icon 601' excluded from the notification priorities, a visual effect of being drawn into an inner side is applied only when the terminal is opened for the first time, and the display thereof is limited to the event related screen.

On the other hand, though not illustrated in the drawing, when the terminal body is switched back to the closed configuration subsequent to processing the event using the event related screen, the event notification priorities of all applications may be initialized and displayed.

For another example, FIG. 6B illustrates an example of a display change of the extended display region when the terminal is switched from the open configuration to the closed configuration.

Referring to FIG. 6B, a home screen including icons, widgets, and the like of one or more applications may be displayed in the inner display regions 151*c*, 151*d* in a configuration where the terminal is open. In this configuration, when the terminal is closed, a visual effect of objects to be displayed in the extended display region in the closed configuration of the terminal while the terminal is closed, for example, time information 604' and icons 601', 602', 603' of favorites designated applications, being drawn out toward the extended display region is displayed. FIGS. 7A, 7B and 7C are various exemplary views displaying a notification icon having a changed notification priority in a mobile terminal associated with the present disclosure.

When the notification priority of the event is changed according to a drag input from the first extended display region to the second extended display region, an image of the relevant notification icon is varied into an image corresponding to the changed notification priority. Accordingly, the user may visually intuitively recognize that the notification priority of the relevant event has been changed.

For an example, as illustrated in FIG. 7A, a notification icon 701*a* that has been displayed in the first extended display region 151*a* may be reduced in size as it is moved to the second extended display region 151*b*. Alternatively, as illustrated in FIG. 7B, a notification icon 702*a* that has been displayed in color may be changed to an icon 702*b* that is monochrome or dimmed according to a change of the notification priority. For another example, as illustrated in FIG. 7C, subsequent to changing the notification priority, it may be displayed in a dot format 704b to know only the occurrence of the event. At this time, when a touch applied to the relevant dot 704b is dragged in a left and right direction, the relevant dot may disappear while the event notification is deleted.

In addition, according to the present disclosure, when a touch input is applied to the notification icon, the controller 180 processes the event differently according to the notification priority corresponding to the relevant notification icon. Specifically, when a touch input is applied to a notification icon whose notification priority has been decreased or excluded from notification priorities, only less event related information may be provided or a graphic user interface (GUI) capable of pushing and deleting the relevant event may be provided. On the contrary, in the case of a notification icon having an increased notification priority, it may be kept according to the touch input or additional information or sub-icons related to event processing may be further provided in the second extended display region 151b.

Accordingly, the user may organize events that need to be currently checked for ease of viewing, and quickly set and change repeated push notifications. In addition, such a setting change may be implemented to be reflected in the inner display region as it is, reducing a repetitive behavior of frequently opening and closing the terminal and the resultant battery consumption.

Figure 8A:
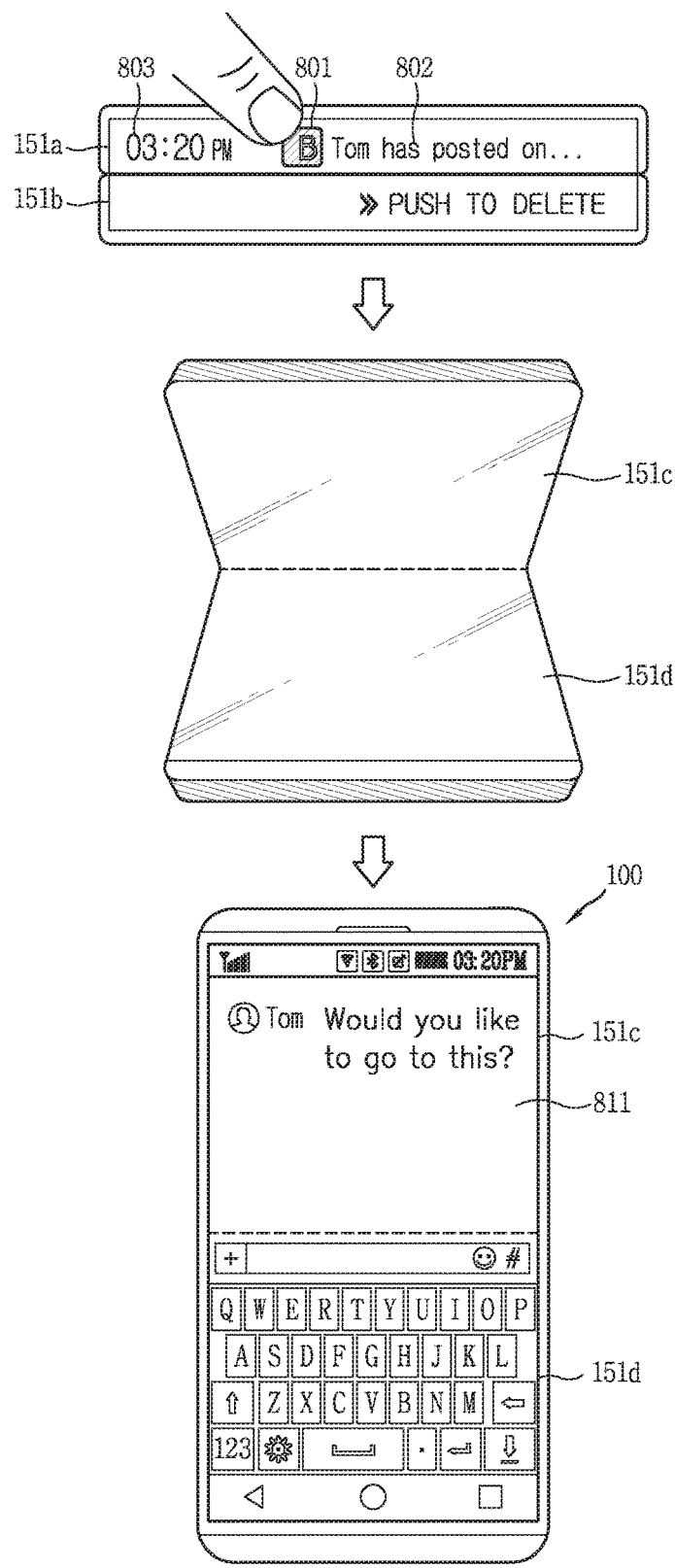
Figure 8B:
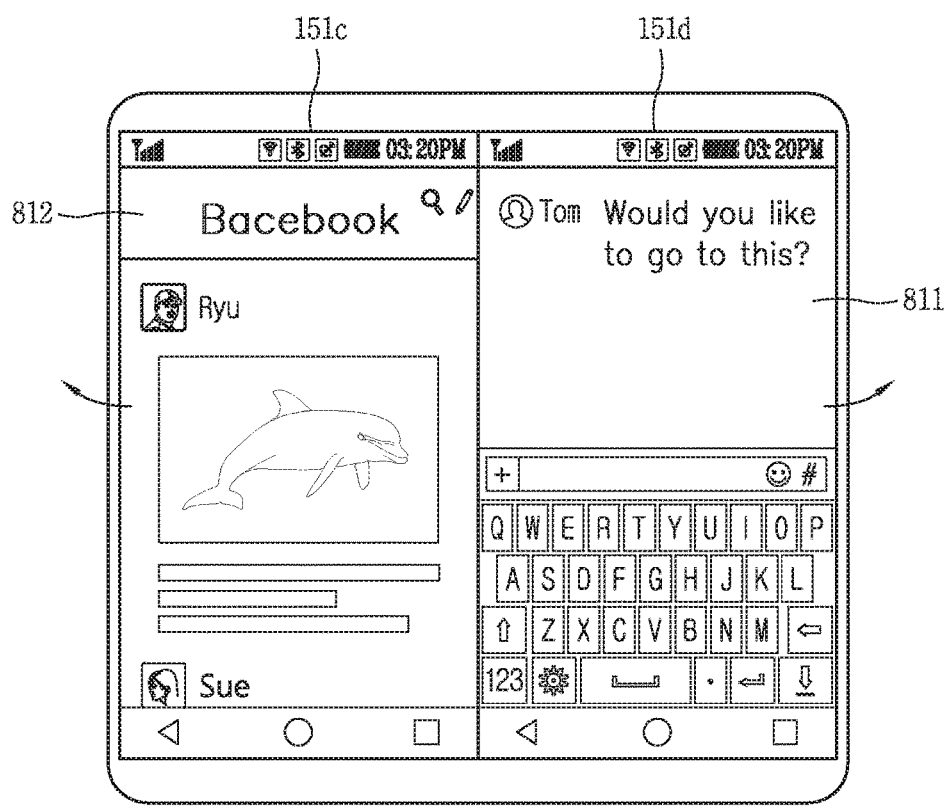

Hereinafter, FIGS. 8A and 8B illustrate specific examples related to the control of a notification icon having a high notification priority.

Referring to FIG. 8A, when the terminal is closed, a notification icon 801 indicating the generation of an event (for example, a new comment upload to an SNS) may be displayed in the first extended display region 151a together with time information 803. At this time, information related to the event (for example, the creator of the uploaded comment and the content of the comment) 802 may be provided in the first extended display region 151a while a touch is applied to the relevant notification icon.

At this time, the relevant information may be displayed while moving in a designated direction according to an amount of the information 802 related to the event. Alternatively, a part of the relevant information may be displayed in the first extended display region 151a and the other part thereof may be displayed in the second extended display region 151b.

For another example, information 802 related to an event is displayed in the first extended display region 151a, and guide information (for example, 'push and delete') related to event processing may be displayed in the second extended display region 151b. In this configuration, when a user applies a drag input or a flicking input in a right direction to the second extended display region 151b in response to the guide information, and the display of the information 802 related to the event disappears while the relevant event notification is deleted.

On the contrary, when a touch input is applied to the information 802 related to the event and the terminal body is switched to an open configuration, screen information including information related to the event (for example, an SNS execution screen including the relevant comment) or screen information 811 related to the processing of the event (for example, an information input screen responding to the comment content) may be provided in the inner display regions 151c, 151d.

Alternatively, as illustrated in FIG. 8B, first display information 812 including information related to the event may be provided in the first inner display region 151c along a direction in which the terminal body is opened (for example, horizontal direction), and screen information 811 related to the processing of the event may be provided in the second inner display region 151d. In this case, the user may simultaneously create a response while checking the event.

In the above, examples of quick screen control related to processing when an event occurs have been described. Hereinafter, examples related to a method of closing a terminal and subsequently performing a task that has been carried out in a configuration where the terminal is open will be described in detail.

FIGS. 8A, 8B, 9A, 9B, 10, 11A, 11B, 12A, 12B, 13A, 13B, 13C and 14 are various exemplary views associated with a method of controlling an extended display region on an outer side of a mobile terminal associated with the present disclosure to quickly control a screen displayed in an inner display region thereof. Here, various examples of mapping a plurality of extended display regions to positions of inner display regions extended from each to control a screen will be described.

Figure 9A:
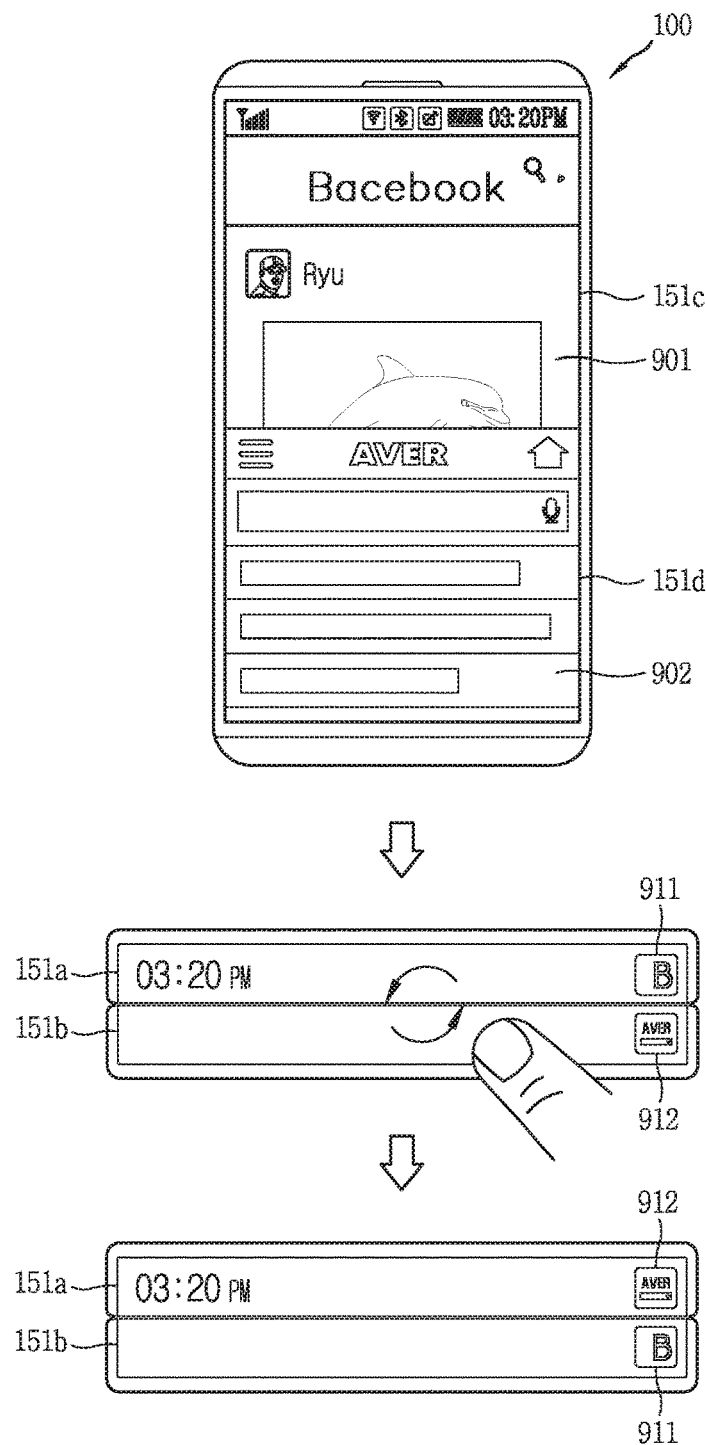
Figure 9B:
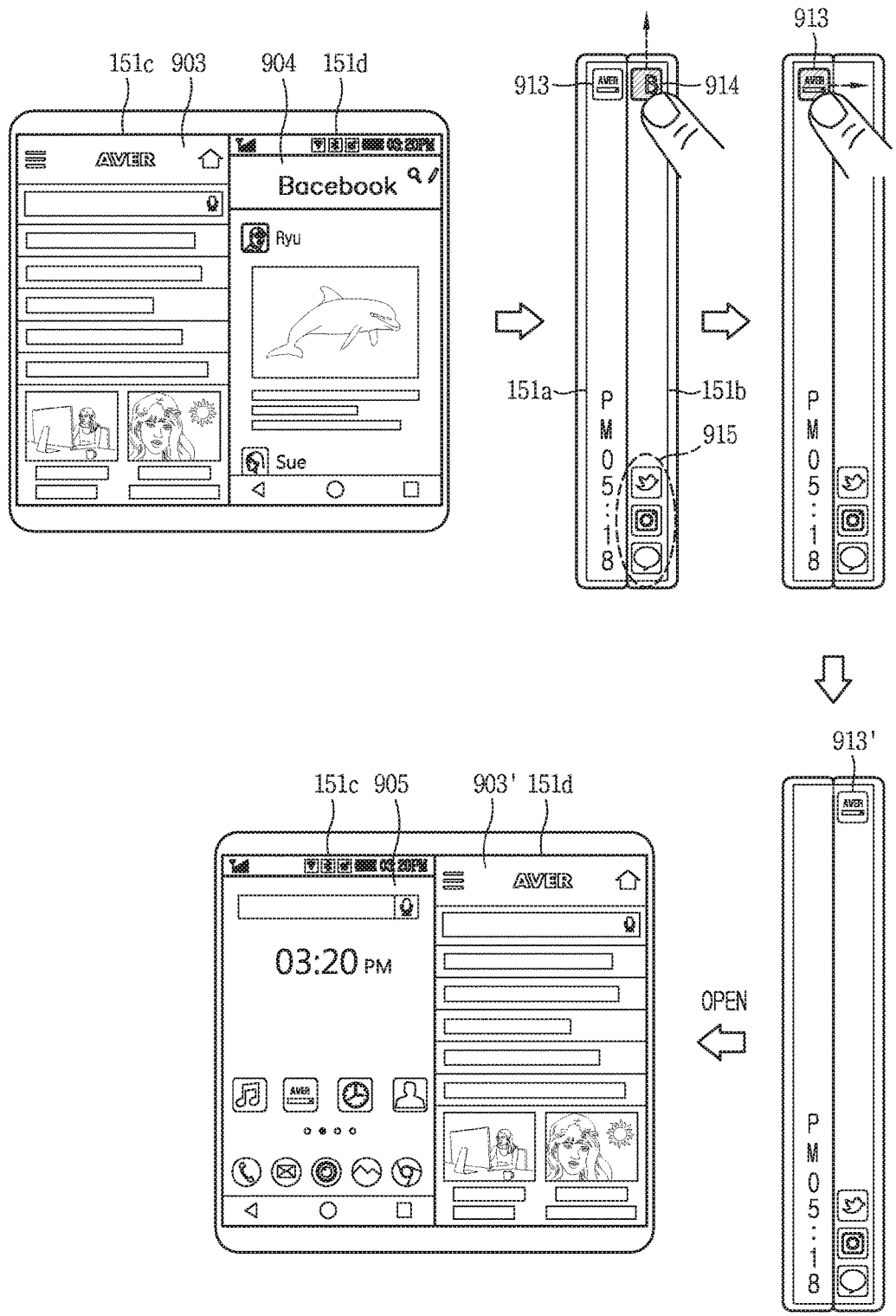

First, FIGS. 9A and 9B illustrate examples of closing a screen configuration that has been displayed in a configuration where the terminal body is open in a different direction and then subsequently controlling the screen configuration will be described.

Referring to FIG. 9A, in a configuration where the terminal is open, a first execution screen 901 of a first application and a second execution screen 902 of a second application are displayed in the inner display regions with respect to the hinge portion 104. Then, when the terminal body is switched to a closed configuration, a plurality of icons corresponding to the first and second execution screens, namely, icons 911, 912 of the first and second applications, are displayed in the first and second extended display regions, respectively, mapped to the positions of the inner display regions where the first and second execution screens have been displayed. In other words, the first icon 911 corresponding to the first execution screen 901 is displayed in the first extended display region 151a disposed on the first body, and the second icon 912 corresponding to the second execution screen 902 that has been displayed at a lower side of the first execution screen in an open configuration is displayed in the second extended display region 151b disposed on the second body.

In this configuration, when a touch input is applied to one of a plurality of icons displayed in the different extended display regions, the controller 180 may control either one of the first and second execution screens that have been displayed at the positions of the corresponding inner display regions.

As illustrated in FIG. 9A, when a gesture for switching the touch inputs of two touch points in the extended display regions 151a, 151b is applied, the display positions of the first and second icons are switched. In other words, the second icon 912 is displayed in the first extended display region, and the first icon 911 is displayed in the second extended display region. Accordingly, a screen configuration in the inner display region of the terminal is also changed such that the first execution screen 901 is disposed below and the second execution screen 902 is disposed above the first execution screen.

FIG. 9B illustrates a view in which the first execution screen 903 of the first application is displayed in a left inner display region 151c and the second execution screen 904 of the second application is displayed in a right inner display region 151d in a configuration in which the display unit of the terminal is open toward a horizontal direction. When the terminal is closed in a horizontal direction, a first icon 913 corresponding to the first execution screen is displayed in the first extended display region 151c located on the left, and a second icon 913 corresponding to the second execution screen is displayed in the second extended display region 151b located on the right. At this time, icons of other applications that have recently been executed may be displayed as additional information 915 in the second extended display region 151d.

In this configuration, when a touch gesture for pushing upward is applied to the second icon 914, the controller 180 recognizes it as an input of an execution end command of the relevant application. Accordingly, when the terminal is subsequently opened, a home screen image may be displayed in the right inner display region 151d.

Next, when a touch gesture for pushing the first icon 913 to the second extended display region 151d is applied, the first icon 913' is moved to the second extended display region 151d, and the controller 180 recognizes it as an input of a configuration change command of the execution screen of the relevant application. Accordingly, when the terminal is switched to an open configuration, a first execution screen 903' corresponding to the first icon is displayed in the right inner display region 151d mapped to the position of the changed second icon 913'. Furthermore, a home screen 905 is displayed in the left inner display region 151c according to the control using the extended display region.

On the other hand, the position of the extended display region mapped to the inner display region may be adaptively varied according to a configuration in which the terminal is placed. For example, when the upper and lower portions of the terminal are turned to be switched in FIG. 9A, the first icon 911 that has been displayed in the first extended display region 151a is moved to the second extended display region 151b, and on the contrary, the second icon 912 is naturally moved to the first extended display region 151a.

Figure 10:
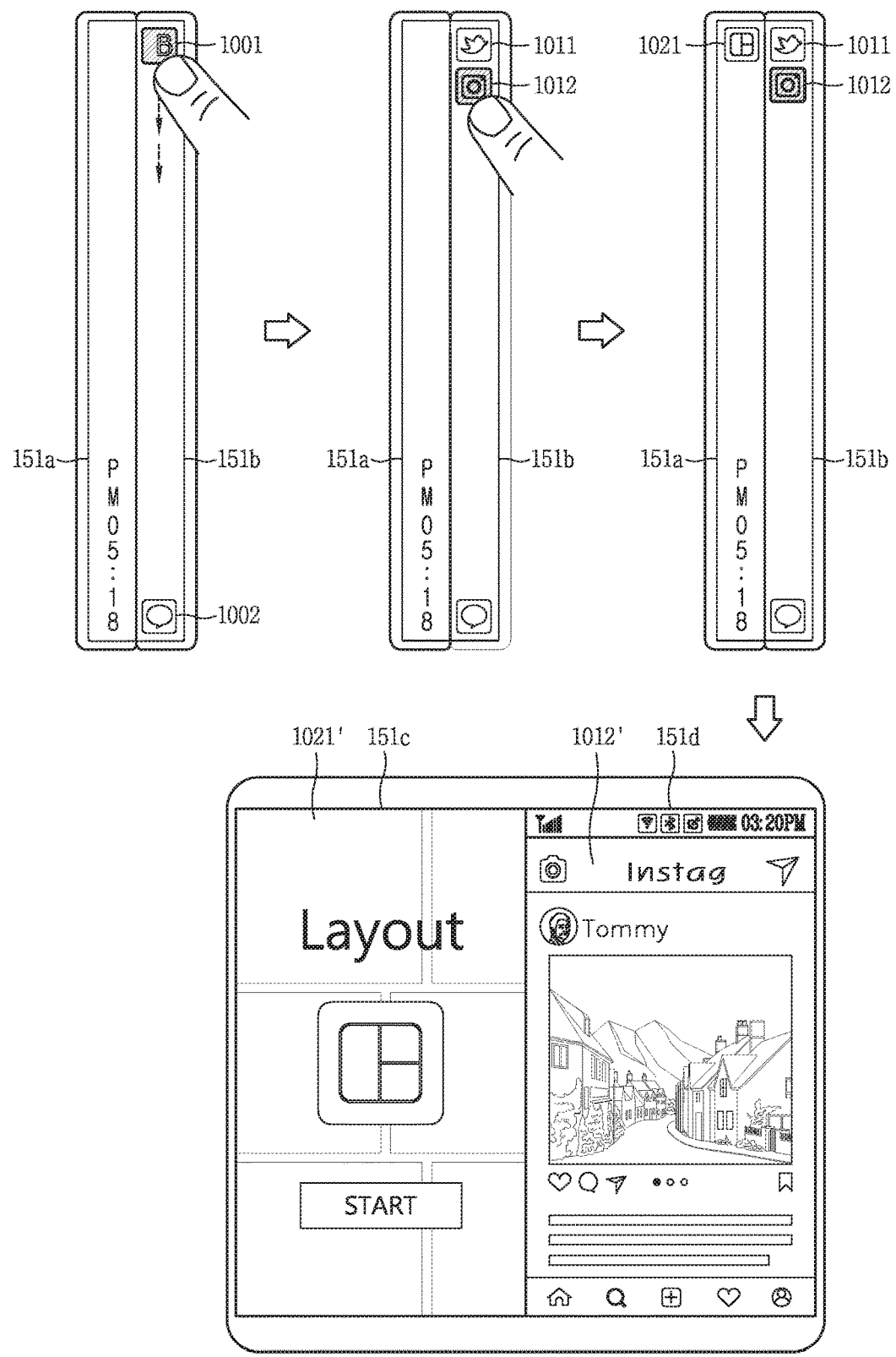

For another example, referring to FIG. 10, when a touch input continuously applied at time intervals to the second extended display region 151b displayed with a first icon 1001 is sensed, the controller 180 may differently change the type of the icon displayed in the second extended display region 151b. For example, the first icon 1001 corresponding to the first execution screen that has been displayed in the inner display region immediately prior to closing the terminal is switched to a group of frequently used applications.

When a touch input is applied to one of icons 1011, 1012 in a first group displayed, a recommendation icon 1021 associated therewith may be displayed in the other extended display region 151a. The recommendation icon 1021 may be any one of a function icon for executing a sub-function of the selected icon 1012, an icon of another application linked therewith, or an application that the user has frequently used together therewith.

In this configuration, when the terminal is opened, a first screen 1021' corresponding to the recommended icon is displayed in the first inner display region 151c, and a first execution screen 1021' corresponding to the icon 1012 that has been selected in the extended display region is displayed in the second inner display region 151d to be mapped to the display position of the icon.

Meanwhile, though not illustrated in the drawing, when there are a plurality of recommendation icons 1021, the first inner display region 151c may be divided into a number of recommendation icons to provide the corresponding execution screens.

Figure 11A:
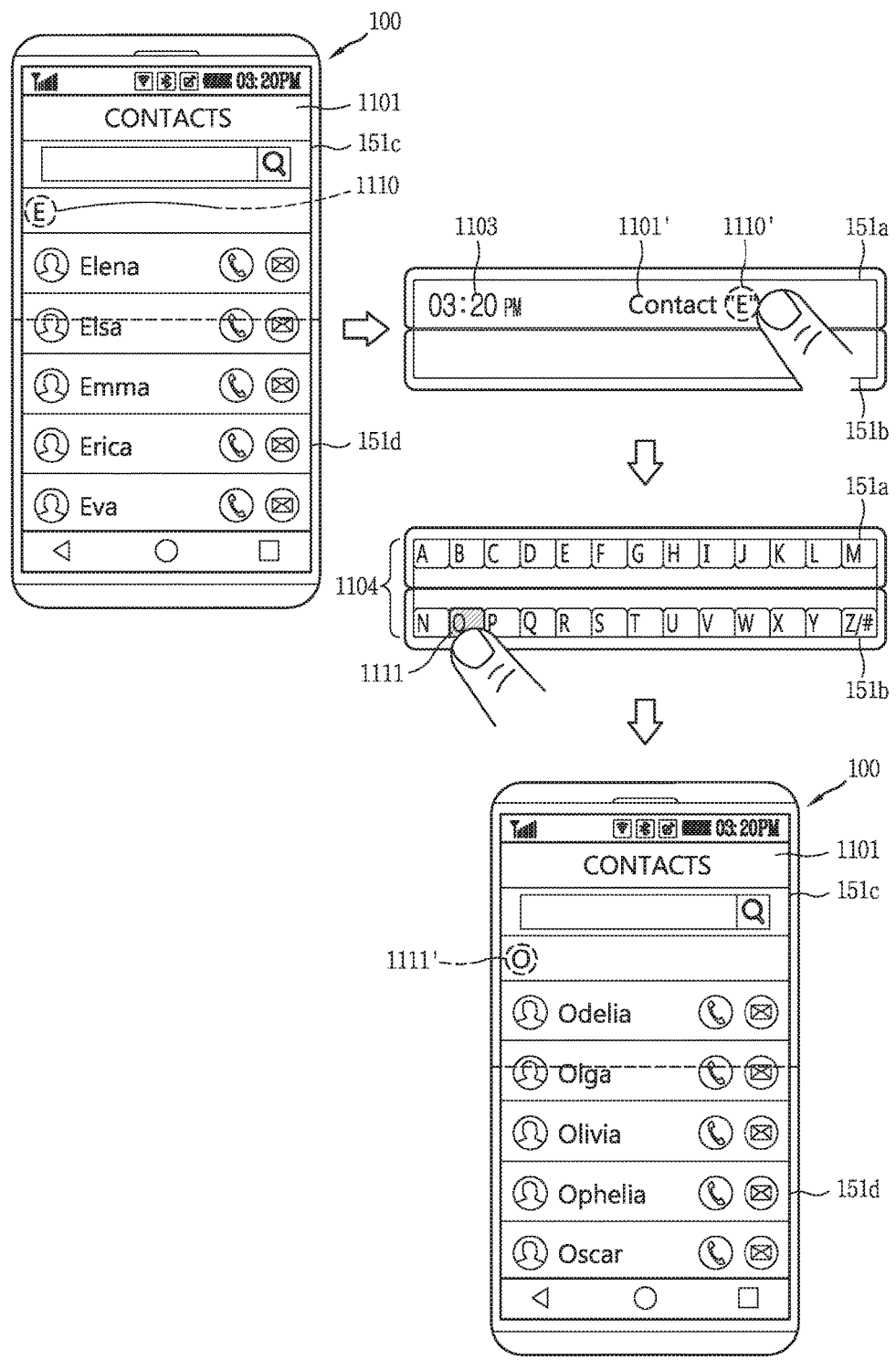
Figure 11B:
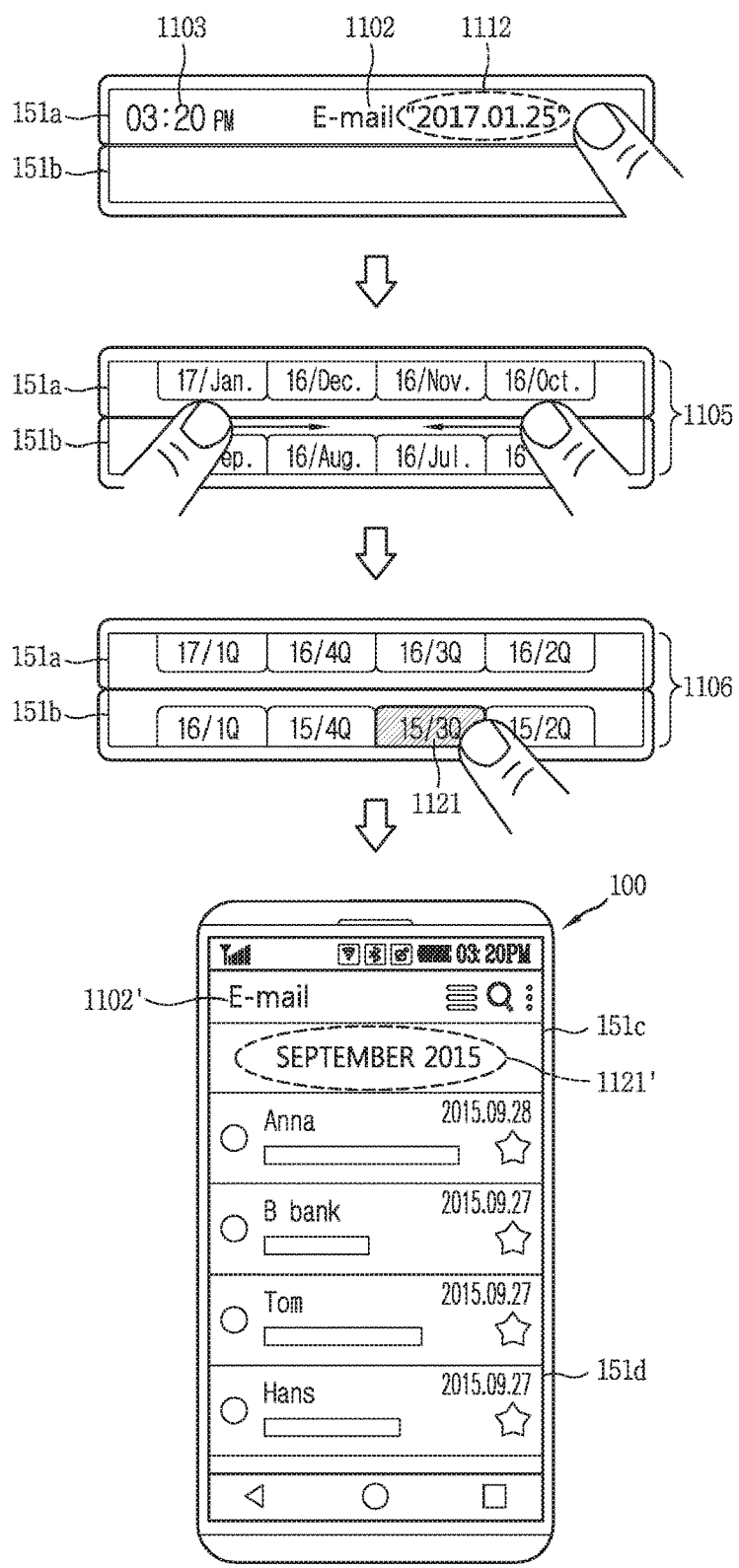

Next, FIGS. 11A and 11B illustrate examples of checking and controlling the position of an operation that has been carried out in the inner display region subsequent to closing the terminal.

First, referring to FIG. 11A, when the terminal body is closed while performing a search operation (for example, contact search of a contacts application) 1101 using the inner display region, the controller 180 may provide index information (for example, 'E' 1110) indicating a position at which the search operation has been stopped to one of the first and second extended display regions. For example, an icon 1101' of an application that has been carried out and the index information 1110' indicating the position of the search operation are displayed together with time information 1103 in the first extended display region 151a. Accordingly, the user may check that the contact 'E' has been searched prior to closing the terminal, and then when a touch is applied to the icon 1101' and then the terminal is opened, its previous operation screen 1101 is displayed in the inner display region.

For another example, when a touch input is applied to the index information 1110' of the first extended display region 151a as illustrated in FIG. 11A, a plurality of indexes 1104 associated with the search operation are displayed in the first and second extended display regions 151a, 151b. At this time, the display order of the plurality of indexes 1104 corresponds to the arrangement positions of the first and second extended display regions. In other words, fast index information is displayed in the first extended display region 151a having a high notification priority, and then the remaining index information is displayed in the second extended display region 151b.

Next, when a touch input is applied to specific index information 'o' and the terminal is opened, a search result screen (for example, 'o') corresponding to the execution screen 1101 of the relevant index information, namely, a search result screen corresponding to the relevant index information 1111' (for example, index contacts initial screen 1101) is displayed in the inner display regions 151c, 151d.

Furthermore, for an embodiment, referring to FIG. 11B, the controller 180 may vary a search unit of a plurality of indexes based on a touch gesture applied to the first and second extended display regions while the plurality of indexes 1104 are displayed. For example, in a state where an icon 1102 of an email application and the last operation position index 1112 are displayed together with the time information 1103 in the first extended display region 151a, when a touch is applied to the displayed index 1112, a plurality of pieces of index information 1105 related to email history search are unfolded in the extended display regions 151a, 151 b.

At this time, when a pinch-in touch input is applied to a boundary between the extended display regions, the controller 180 further enlarges an index search range. At this time, the enlarged extent of the index search range is proportional to a distance and a number of times of pinch-in touch inputs. When a touch input is applied to one 1121 of a plurality of changed index information 1106 and when the terminal is opened, an email history screen 1102' corresponding to the position 1121' of the selected index information is displayed in the inner display regions 151c, 151d.

Hereinafter, with reference to FIGS. 12A and 12B, examples of applying a touch input to the inner display region in a configuration where the terminal is open so as to control the display of information in an outer extended display region will be described.

Figure 12A:
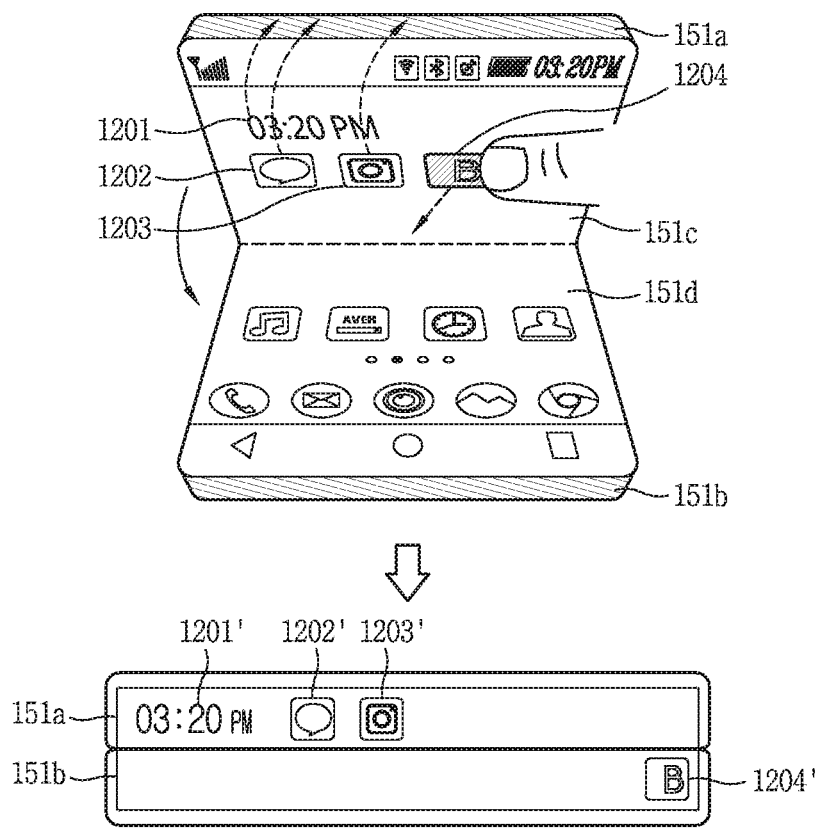

Referring to FIG. 12A, the controller 180 may set the notification priorities of events to be displayed in the extended display region in a configuration where the terminal is open. Specifically, as illustrated in FIG. 12A, when a home screen is displayed in the inner display regions 151*c*, 151*d* in a configuration where the terminal is open, and the terminal is closed, icons 1202, 1203, 1204 of some applications in which events occur among objects displayed on the home screen and time information 1201 are moved and displayed in the outer extended display region 151*a*.

At this time, when a flicking touch is applied to the specific icon 1204 in a downward direction and the terminal is closed, the relevant icon 1204 is excluded from the event notification priorities. Accordingly, the time information and other icons 1201', 1202', 1203' are displayed in the first extended display region 151*a*, and the icon 1204' excluded from the notification priorities is displayed alone in the second extended display region 151*b*.

For another example, referring to FIG. 12B, in a configuration where the terminal is open, when a drag input is applied in a horizontal direction to an icon 1211 of an application being executed in the inner display regions 151*c*, 151*d*, for example, a message application, and the terminal is closed, an icon 1211' of an application that has been executed is displayed in the first extended display region 151*a* of the terminal, and the last dialog or next dialog of the next dialog window in the dialog window list is displayed in the second extended display region 151*b*, (e.g., 'Yes, I have confirmed') 1213.

Figure 13A:
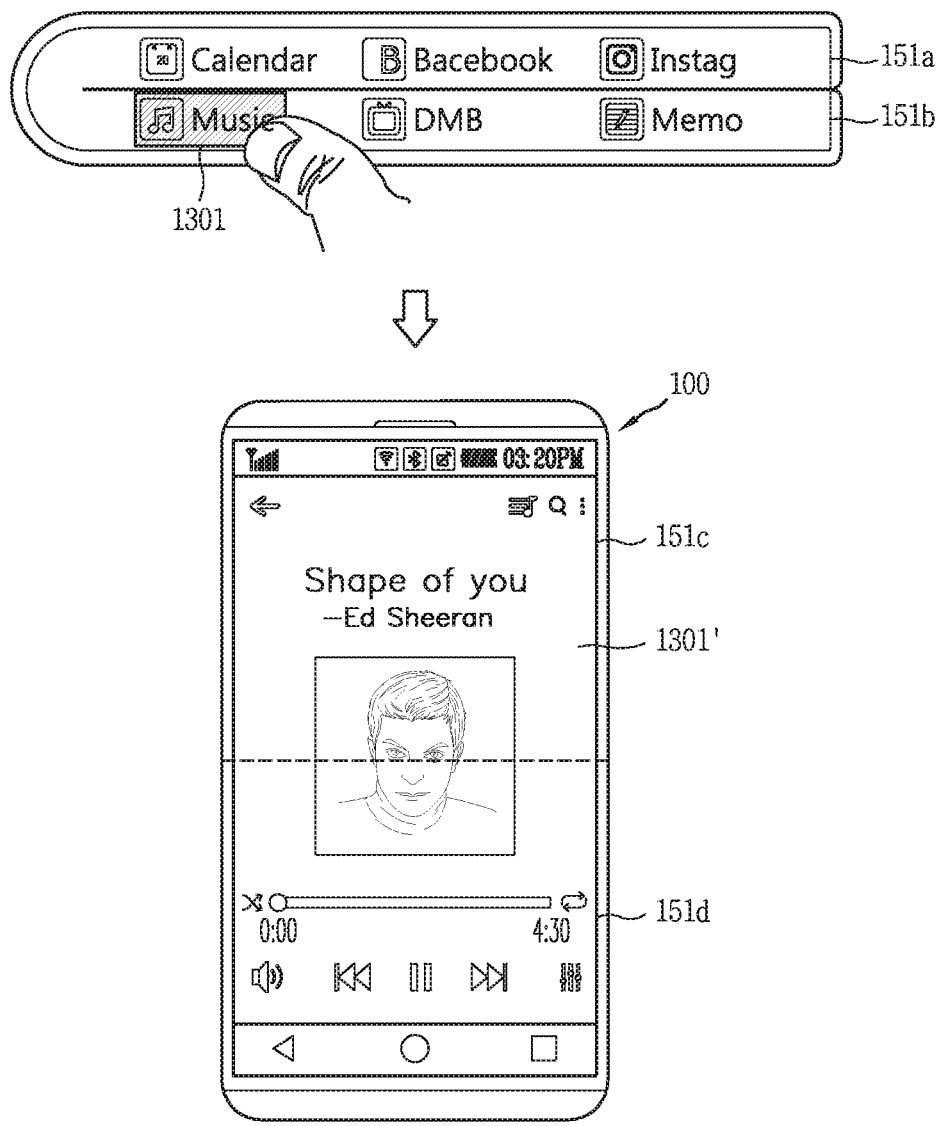

For still another example, referring to FIG. 13A, as the terminal is switched from an open configuration to a closed configuration, it is seen that a list of icons of all applications that have been executed in the extended display regions 151*a*, 151*b* is displayed. At this time, the classification criteria of icons displayed in the first extended display region 151*a* and the second extended display region 151*b* may correspond to at least one of an execution order, a total execution time, and a mapping position of the inner display region that has been executed.

Figure 13B:
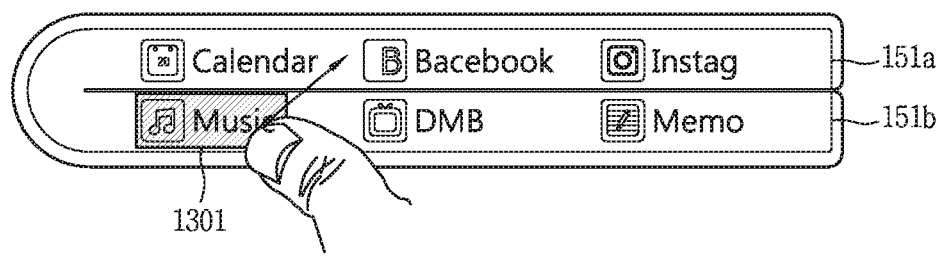
Figure 13C:
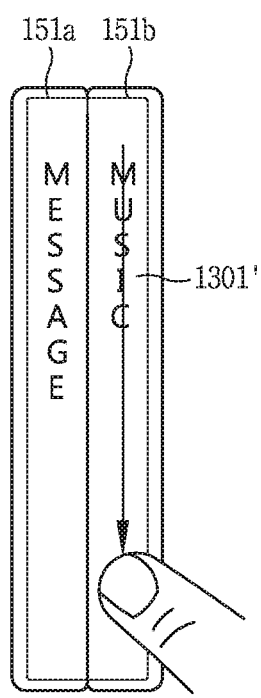

For an example, as illustrated in FIG. 13A, when a touch is applied to an icon 1301 of an application desired to be instantly checked and the terminal is opened, the relevant application, for example, a sound playback screen 1301' is displayed in the entire inner display regions 151*c*, 151*d*. For another example, as illustrated in FIG. 13B, when a touch applied to an icon 1301 of an application is dragged to a specific position in the first extended display region 151*a*, the display order of the relevant icons is changed, and the display order and screen configuration of execution screens in the inner display regions are correspondingly changed. For still another example, when a drag input is applied in a length direction to an icon (e.g., 'MUSIC') 1301 'of an application displayed in a specific extended display region 151*b*, the relevant icon is deleted, and the execution thereof is terminated even in the inner display regions.

Figure 14:
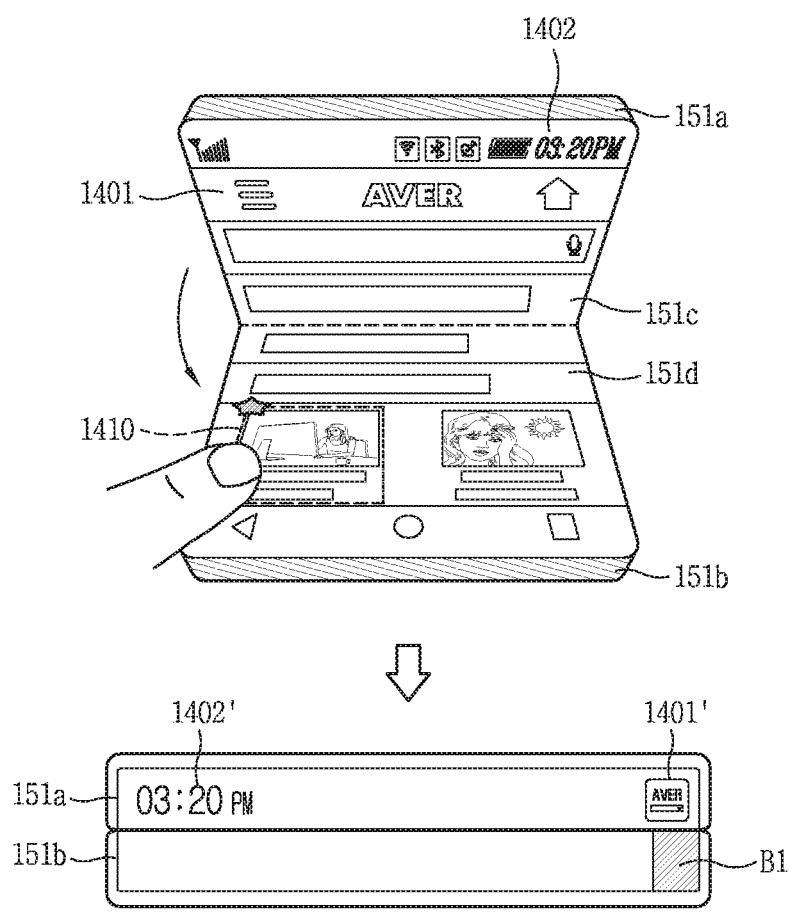

For yet still another example associated with the present disclosure, referring to FIG. 14, a book marking function may be carried out using the extended display region.

Specifically, referring to FIG. 14, when a specific region 1410 is bookmarked on a screen displayed in the inner display region, for example, a web page 1401, in a configuration where the terminal is open and the main body is closed, the controller 180 displays an icon of the last executed application or an icon on which an event has occurred in one 151*a* of the first and second extended display regions, and displays an indicator (B1) for making a shortcut to the bookmarked specific region in the other region 151*b*.

When a touch is applied to the indicator (B1) and the terminal is opened, it may be possible to enter a shortcut to the bookmarked specific region at any time. Furthermore, when there are a plurality of bookmarked specific regions, the indicators may be displayed in different colors or shapes. In addition, the relevant indicator may be provided with an indication that the corresponding application can be intuitively understood.

In addition, though not illustrated in the drawing, its associated control menu may be provided in the extended display region so that an operation that has been carried out in a configuration where the terminal is open can be subsequently performed using the extended display region for a predetermined time even subsequent to closing the terminal. For example, after the terminal is closed during a call, an icon for terminating the call, an icon of its associated application for performing a function related to the calling party (e.g., sending a message, transmitting a photo, etc.) may be provided. Alternatively, after the terminal is closed during sound recording, a control bar for performing the associated sound control may be provided in the extended display region together with an icon for continuously performing recording.

As described above, according to a mobile terminal according to the embodiment of the present disclosure and a control method thereof, the extended display regions may be merged to easily check useful information even when the terminal is closed. In addition, the associated functions may be carried out intuitively and quickly through a gesture for separating or merging the extended display regions.

As described above, according to a mobile terminal according to the embodiment of the present disclosure and a control method thereof, it may be possible to perform processing related to an event using the extended display region at an outer side without opening the terminal, and for such an example, it may be possible to easily change the notification priority of an event based on a drag touch input. Furthermore, the user may view the display state and position of the notification icon to quickly know that the notification priority of the event has been changed.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A terminal, comprising:
   a first body and a second body, wherein the first body and the second body are positionable between an open state and a closed state, wherein in the open state a first side of the first body and a first side of the second body are exposed and in the closed state the first side of the first body faces the first side of the second body, and wherein the first body has an edge that extends from the first side of the first body and the second body has an edge that extends from the first side of the second body;
a hinge connecting the first body with the second body, wherein the hinge permits positioning of the first body and the second body;
a display comprising first and second display regions respectively located on the first side of the first body and the first side of the second body, wherein the display further comprises third and fourth display regions which respectively extend from the first and second display regions and which are respectively located at the edges of the first and second bodies; and
a controller configured to:
cause the display to display a notification icon indicating occurrence of an event in at least one of the third and fourth display regions when the event occurs in an application while in the closed state;
in response to a touch gesture applied to the notification icon, cause the display to display information related to the event in the at least one of the third and fourth display regions; and
in response to switching from the closed state to the open state, cause the display to display a screen related to an event except for the event corresponding to the notification icon to which the touch gesture is applied in the at least one of the first and second display regions.

2. The terminal of claim 1, wherein the controller is further configured to:
cause the display to display information related to the event in the at least one of the third and fourth display regions while the touch gesture applied to the notification icon is maintained.

3. The terminal of claim 2, wherein the information related to the event displayed in the at least one of the third and fourth display regions disappears when the touch gesture applied to the notification icon is released.

4. The terminal of claim 1, wherein the controller is further configured to:
cause the display to display a plurality of notification icons in the third and fourth display regions while in the closed state; and
cause the plurality of notification icons to be displayed along a path until reaching a location of one of the first display region or the second display region when switching from the closed state to the open state.

5. The terminal of claim 4, wherein a rate at which the plurality of notification icons are displayed along the path corresponds to speed of the switching from the closed state to the open state.

6. The terminal of claim 1, wherein the controller is further configured to:
change an image of the notification icon to an image indicating an event checking when the touch gesture is applied to the notification icon.

7. The terminal of claim 1, wherein in response to a subsequent touch input after the touch input is applied to the notification icon, the controller is further configured to remove the notification icon from the at least one of the third and fourth display regions.

8. The terminal of claim 1, wherein when a touch input is applied to the information related to the event and the terminal body is switched from the closed state to the open state, the controller is further configured to cause the display to display screen information including information related to the event or including information related to a processing of the event.

9. The terminal of claim 1, wherein the controller is further configured to:
cause the display to display a first execution screen on the first display region and display a second execution screen on the second display region, while in the open state;
cause the display to respectively display first and second icons corresponding to the first and second execution screens on the third and fourth display regions, when the terminal is switched to the open state; and
control applications associated with the first and second execution screen in response to a respective input to the first and second icons.

10. The terminal of claim 1, wherein the controller is further configured to:
execute a search operation for an application while in the closed state;
cause the display to display index information indicating an interrupted position of the search operation on the third display region;
cause the display to display a plurality of indexes related to the search operation at the third and fourth display regions when a touch input is received at the displayed index information; and
cause the display to display the plurality of indexes in an order corresponding to relative positions of the third and fourth display regions.

11. The terminal of claim 10, wherein the controller is further configured to:
cause the display to display a search result screen on one of the first display region or the second display region when a touch input is received at a selected index of the plurality of indexes and the terminal is switched to the open state, wherein displayed location of the search result screen corresponds to a displayed position of the selected index.

12. The terminal of claim 10, wherein a search unit of the plurality of indexes is varied based on a touch gesture received at the third and fourth display regions while the plurality of indexes are displayed.

13. The terminal of claim 1, wherein the controller is further configured to:
cause the display to display the notification icon in either one of the third display region or the fourth display region and display an indicator for making a shortcut to a bookmarked specific region in another one of the third display region or the fourth display region, when the specific region is bookmarked on a screen displayed on the first and second display regions and the terminal is switched to the closed state.

14. A terminal, comprising:
a first body and a second body, wherein the first body and the second body are positionable between an open state and a closed state, wherein in the open state a first side of the first body and a first side of the second body are exposed and in the closed state the first side of the first body faces the first side of the second body, and wherein the first body has an edge that extends from the first side of the first body and the second body has an edge that extends from the first side of the second body;
a display comprising first and second display regions respectively located on the first side of the first body and the first side of the second body, wherein the display further comprises third and fourth display regions which respectively extend from the first and second display regions and which are respectively located at the edges of the first and second bodies; and a controller configured to:
cause the display to display a notification icon indicating occurrence of an event in at least one of the third and fourth display regions when the event occurs in an application while in the closed state;
in response to switching from the closed state to the open state after a touch gesture is applied to the notification icon, cause the display to display a screen related to an event except for the event corresponding to the notification icon to which the touch gesture is applied in the at least one of the first and second display regions.

15. The terminal of claim 14, wherein the controller is further configured to:
change an image of the notification icon to an image indicating an event checking when the touch gesture is applied to the notification icon.

* * * * *